(12) United States Patent
Mase et al.

(10) Patent No.: US 8,428,862 B2
(45) Date of Patent: Apr. 23, 2013

(54) COLLISION DETECTING DEVICE

(75) Inventors: Yusuke Mase, Okazaki (JP); Masaki Ikai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/231,645

(22) Filed: Sep. 13, 2011

(65) Prior Publication Data
US 2012/0029814 A1 Feb. 2, 2012

Related U.S. Application Data

(63) Continuation of application No. PCT/JP2009/071802, filed on Dec. 28, 2009.

(51) Int. Cl.
| | |
|---|---|
| G06F 17/10 | (2006.01) |
| G06G 7/78 | (2006.01) |
| G08G 1/16 | (2006.01) |
| B60R 22/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .......... 701/301; 701/45; 701/46; 701/47; 180/271; 180/274

(58) Field of Classification Search .......... 180/274, 180/271, 282; 701/45, 46, 47; 702/33; 340/436
See application file for complete search history.

(56) References Cited

U.S. PATENT DOCUMENTS

| | | | | |
|---|---|---|---|---|
| 5,225,985 A | * | 7/1993 | Okano | 701/46 |
| 5,431,441 A | * | 7/1995 | Okano | 280/735 |
| 5,555,174 A | * | 9/1996 | Okimoto et al. | 701/46 |
| 6,516,278 B1 | * | 2/2003 | Ishizaki et al. | 702/33 |
| 6,561,301 B1 | * | 5/2003 | Hattori et al. | 180/274 |

(Continued)

FOREIGN PATENT DOCUMENTS

| | | |
|---|---|---|
| JP | A-2007-192577 | 8/2007 |
| JP | A-2007-290682 | 11/2007 |

(Continued)

OTHER PUBLICATIONS

International Search Report in International Application No. PCT/JP2009/071802; dated Mar. 23, 2010 (with English-language translation).

*Primary Examiner* — Khoi Tran
*Assistant Examiner* — Nicholas Kiswanto
(74) *Attorney, Agent, or Firm* — Oliff & Berridge, PLC

(57) ABSTRACT

An object is to be able to accurately discriminate an object of a collision. A device has a collision detection to which are connected a pressure sensor that detects pressure within a pressure chamber, and a vehicle speed sensor that detects vehicle speed, and the collision detection determines effective mass of a collided object on the basis of an integrated value obtained by integrating, at a predetermined sectional integration width, detection results of the pressure sensor, and a converted vehicle speed signal obtained by subtracting a predetermined value α from a vehicle speed signal of the vehicle speed sensor by using a predetermined vehicle speed converting map or the like. Then, when the determined effective mass exceeds a predetermined threshold value, the collided object is discriminated as a pedestrian.

8 Claims, 20 Drawing Sheets

U.S. PATENT DOCUMENTS

| | | | |
|---|---|---|---|
| 6,882,916 B2* | 4/2005 | Takafuji et al. | 701/45 |
| 7,509,196 B2* | 3/2009 | Oishi | 701/45 |
| 7,823,683 B2* | 11/2010 | Kiribayashi | 180/274 |
| 7,920,055 B2* | 4/2011 | Lentes et al. | 340/436 |
| 8,181,730 B2* | 5/2012 | Higuchi | 180/274 |
| 2004/0210367 A1* | 10/2004 | Takafuji et al. | 701/45 |
| 2006/0087417 A1* | 4/2006 | Kiribayashi | 340/435 |
| 2007/0164574 A1 | 7/2007 | Tanabe | |
| 2009/0020353 A1 | 1/2009 | Kiribayashi | |
| 2009/0021030 A1 | 1/2009 | Tanabe | |
| 2009/0312949 A1 | 12/2009 | Suzuki et al. | |

FOREIGN PATENT DOCUMENTS

| | | |
|---|---|---|
| JP | A-2007-290689 | 11/2007 |
| JP | A-2009-023410 | 2/2009 |
| JP | A-2009-040393 | 2/2009 |
| JP | A-2009-234427 | 10/2009 |
| JP | A-2009-298265 | 12/2009 |

* cited by examiner

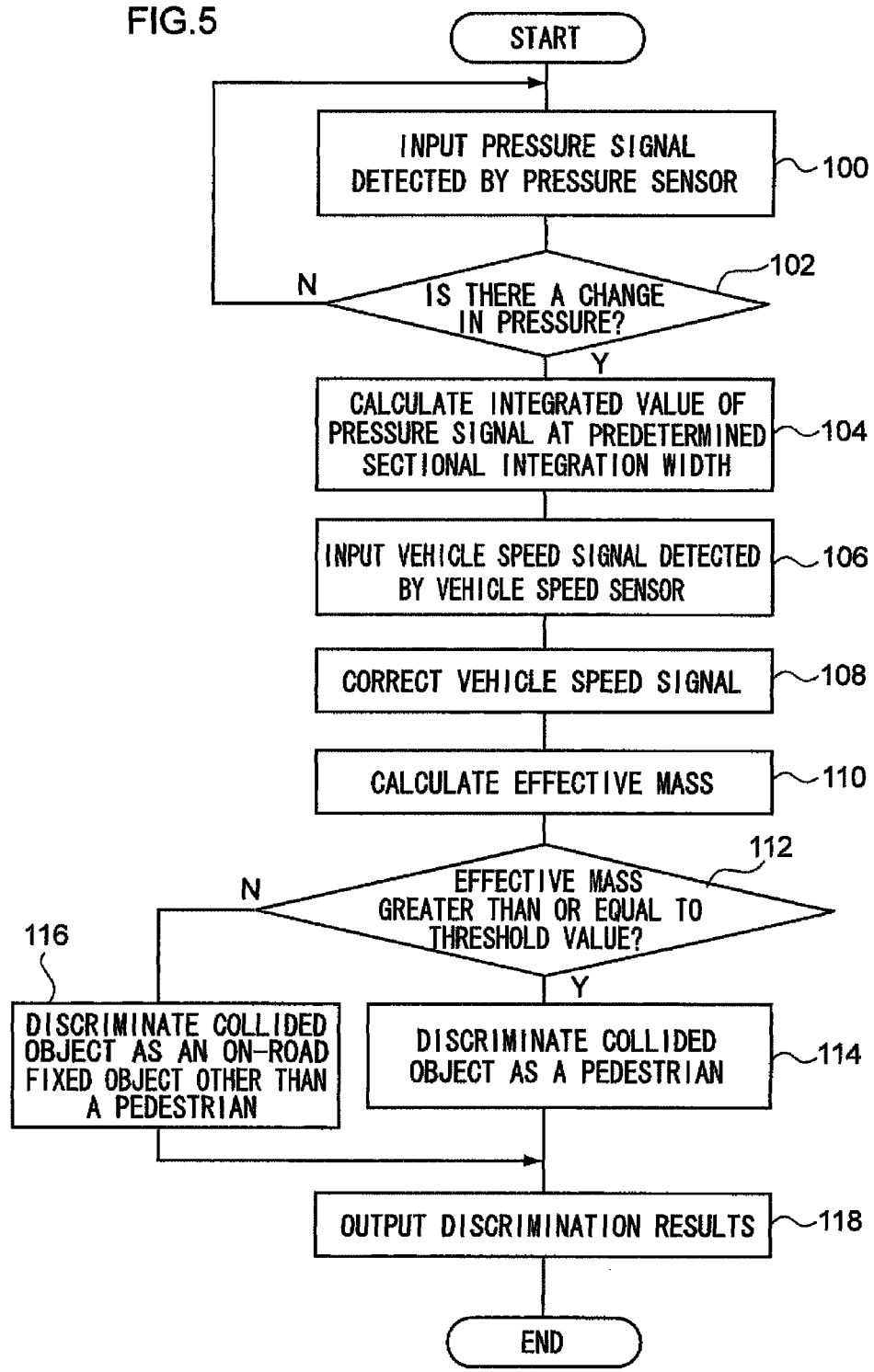

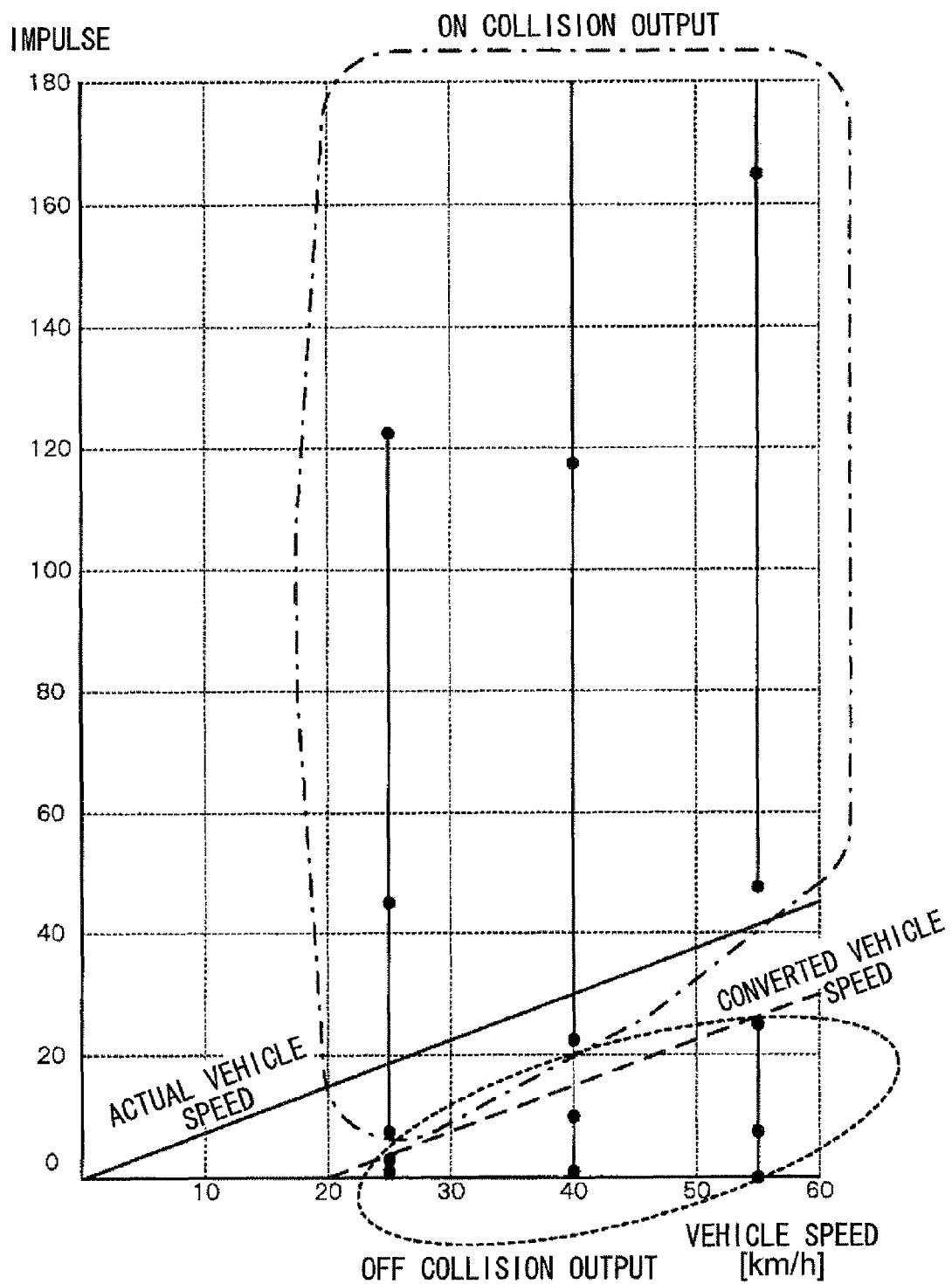

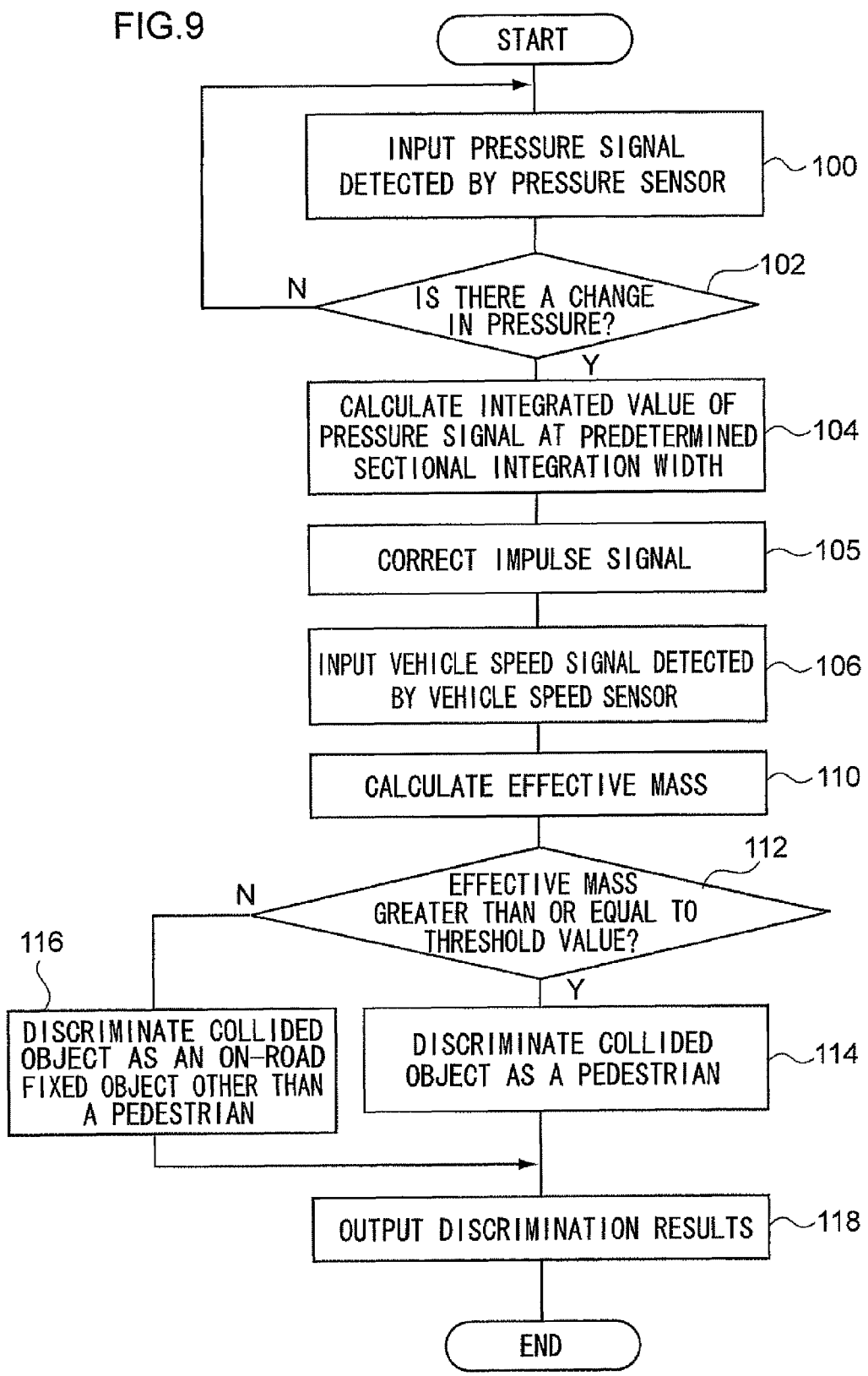

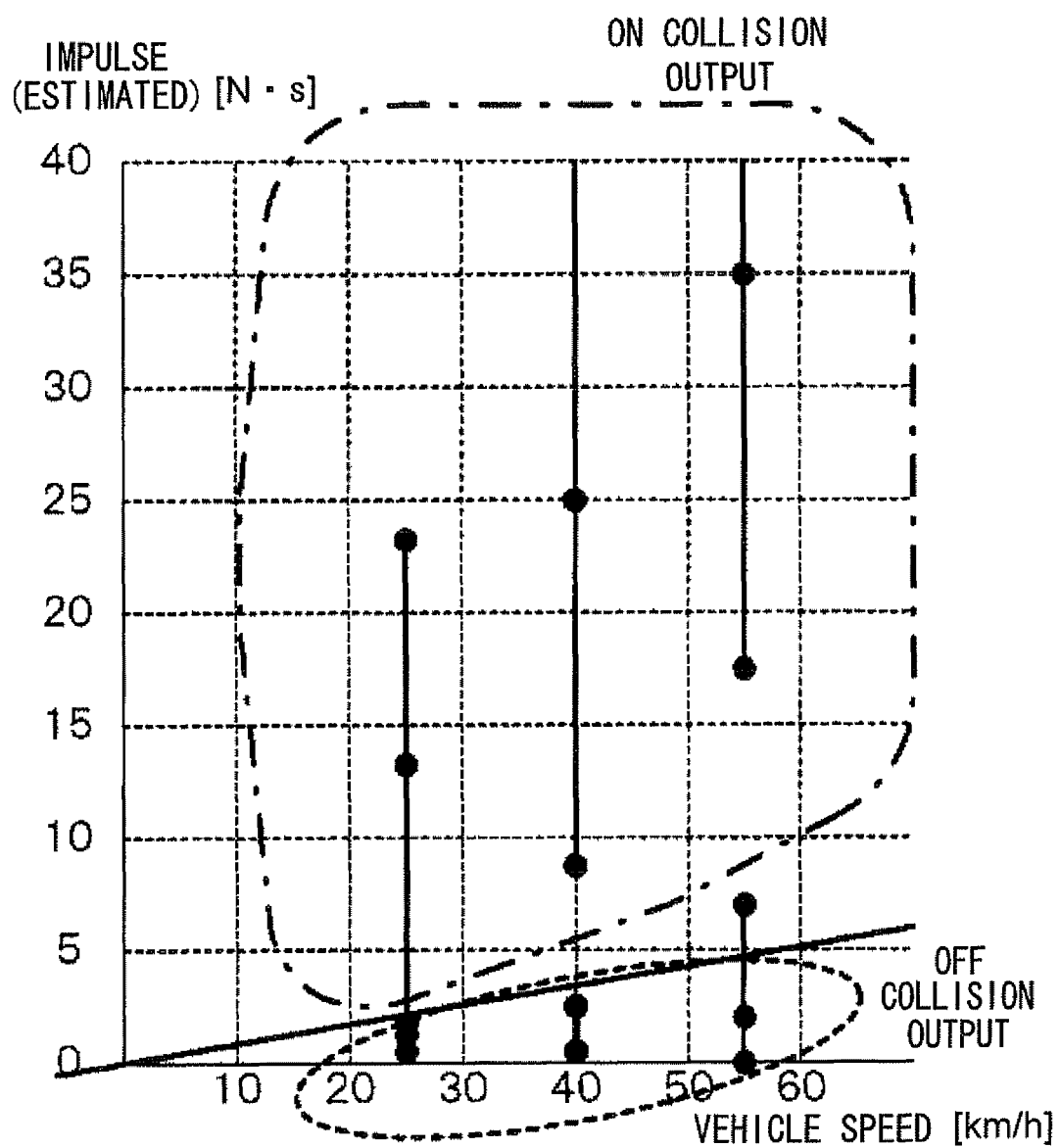

COLLISION DETECTING DEVICE

This is a Continuation of International Application No. PCT/W2009/071802 filed Dec. 28, 2009. The disclosure of the prior application is hereby incorporated by reference herein in its entirety.

TECHNICAL FIELD

The present invention relates to a collision detecting device, and in particular, to a collision detecting device that detects a collision on the basis of a physical amount corresponding to load generated by the collision.

BACKGROUND TECHNOLOGY

Collision detecting devices, that can judge whether or not a collided object that has collided with a bumper of a vehicle is a pedestrian, have been proposed conventionally.

For example, the technique disclosed in Japanese Patent Application Laid-Open No. 2007-290682 has a backboard that is fixed to a side member of a vehicle, chamber members that are disposed further forward than the backboard and demarcate a sealed chamber space, and pressure sensors detecting the pressure of the chamber space, and there is proposed sensing a collision from the change in pressure of the chamber space. Further, there is proposed carrying out discrimination of a collided object from the change in pressure of the chamber space at the time of a collision.

SUMMARY OF THE INVENTION

Problems to be Solved by the Invention

However, in the technique recited in Japanese Patent Application Laid-Open No. 2007-290682, discrimination of the collided object is carried out from the change in pressure of the chamber space, but, for example, in a case of calculating the effective mass of a collided object from the change in pressure and discriminating the collided object, when there is a collision with a child, the integrated value of the impulse obtained from the change in pressure is small as compared with the case of an adult. Accordingly, when a threshold value is set so as to suit a collision with a child, it is difficult to discriminate from on-road fixed objects or the like, such as poles or the like, other than pedestrians.

The present invention was made in consideration of the above-described circumstances, and an object thereof is to be able to accurately discriminate the object of a collision.

Means for Solving the Problems

In order to achieve the above-described object, the invention recited in claim 1 has: pressure detecting means for detecting pressure of a pressure chamber that is disposed within a vehicle bumper; vehicle speed detecting means for detecting vehicle speed; discrimination value calculating means for, in accordance with a vehicle speed detected by the vehicle speed detecting means, deciding upon a sectional integration width at which detection results of the pressure detecting means are integrated, and calculating a discrimination value for discriminating a type of a collided object, on the basis of an integrated value obtained by integrating, at the sectional integration width that was decided upon, the detection results of the pressure detecting means; and discriminating means for discriminating the type of the collided object on the basis of the discrimination value.

In accordance with the invention recited in claim 1, the pressure of the pressure chamber that is disposed within a vehicle bumper is detected at the pressure detecting means.

At the discrimination value calculating means, the sectional integration width is decided upon in accordance with the vehicle speed, and a discrimination value for discriminating the type of the collided object is calculated on the basis of the integrated value obtained by integrating, at the sectional integration width that was decided upon, the detection results of the pressure detecting means. Namely, by calculating the integrated value of the pressure generated by the collision, the impulse is calculated as the discrimination value. Note that, as in the invention recited in claim 6 for example, the discrimination value calculating means may calculate the effective mass of the collided object as the discrimination value, on the basis of the integrated value, that is obtained by integrating, at a predetermined sectional integration width, the detection results of the pressure detecting means, and the detection results of the vehicle speed detecting means. Namely, the fact that the impulse and the momentum generated by a collision are equal is utilized, and the effective mass of the collided object can be calculated as the discrimination value.

Then, at the discriminating means, the type of the collided object is discriminated on the basis of the discrimination value calculated by the discrimination value calculating means.

Namely, at the time of calculating the discrimination value, if the entire detection results of the pressure detecting means are integrated, it is difficult to discriminate between a collision with a pedestrian and with an on-road fixed object such as a pole or the like. However, the object of the collision can be discriminated accurately by calculating the discrimination value by using the integrated value that is obtained by integrating at the sectional integration width that was decided upon in accordance with the vehicle speed.

Note that, as in the invention recited in claim 3, the collision detecting device may further have correcting means for correcting the discrimination value on the basis of energy needed from a vehicle bumper surface deforming due to a collision until the pressure chamber deforms, and the discriminating means may discriminate the type of the collided object on the basis of a corrected value corrected by the correcting means. Namely, due to the discrimination value being corrected by the correcting means, a dead zone of the pressure detecting means due to the space and the absorber or the like that exist between the bumper surface and the chamber member is corrected, and the type of the collided object is discriminated by using the corrected discrimination value, and therefore, the object of the collision can be discriminated accurately.

At this time, as in the invention recited in claim 4, the discrimination value calculating means may calculate the discrimination value on the basis of the integrated value obtained by integrating at the sectional integration width, and the detection results of the vehicle speed detecting means, and the correcting means may correct the discrimination value by correcting the detection results of the vehicle speed detecting means of the time of calculating the discrimination value, on the basis of energy needed from a vehicle bumper surface deforming until the pressure chamber deforms. For example, by subtracting a vehicle speed, that is determined in advance on the basis of the energy needed from the vehicle bumper surface deforming until the pressure chamber deforms, from the actual vehicle speed and correcting the detection results of the vehicle speed detecting means, the discrimination value can be corrected, and due thereto, the object of the collision can be discriminated accurately.

Further, as in the invention recited in claim 5, the correcting means may correct the discrimination value by correcting detection results of the pressure detecting means on the basis of energy needed from a vehicle bumper surface deforming until the pressure chamber deforms. For example, by adding an impulse value, that is determined in advance on the basis of the energy needed from the vehicle bumper surface deforming until the pressure chamber deforms, to the impulse value (integrated value) determined from the actual pressure, and correcting the detection results of the pressure detecting means, the discrimination value can be corrected, and due thereto, the object of the collision can be discriminated accurately.

The invention recited in claim 7 has: detecting means for detecting a physical amount corresponding to load generated by a collision; discrimination value calculating means for, in accordance with vehicle speed, deciding upon a sectional integration width at which detection results of the detecting means are integrated, and calculating a discrimination value for discriminating a type of a collided object, on the basis of an integrated value obtained by integrating, at the sectional integration width that was decided upon, the physical amount detected by the detecting means; and discriminating means for discriminating the type of the collided object on the basis of the discrimination value.

In accordance with the invention recited in claim 7, a physical amount corresponding to the load generated by a collision is detected at the detecting means.

At the discrimination value calculating means, the sectional integration width is decided upon in accordance with the vehicle speed, and the discrimination value for discriminating the type of the collided object is calculated on the basis of an integrated value obtained by integrating, at the sectional integration width that was decided upon, the physical amount detected by the detecting means, and the detection results of the vehicle speed detecting means.

Then, at the discriminating means, the type of the collided object is discriminated on the basis of the discrimination value calculated by the discrimination value calculating means.

Namely, at the time of calculating the discrimination value, if the entire physical amount (e.g., pressure corresponding to the load generated by the collision) is integrated, it is difficult to discriminate between a collision with a pedestrian and with an on-road fixed object such as a pole or the like. However, the collided object can be discriminated accurately by calculating the discrimination value by using the integrated value that is obtained by integrating at the sectional integration width that was decided upon in accordance with the vehicle speed.

Effects of the Invention

As described above, in accordance with the present invention, there is the effect that the object of a collision can be discriminated accurately by calculating a discrimination value, for discriminating the type of the collided object, by using an integrated value that is obtained by integrating at a predetermined sectional integration width.

BRIEF DESCRIPTION OF THE DRAWINGS

FIG. 5 is a flowchart showing an example of the flow of processings carried out at a collision detection ECU of a collision detecting device relating to a first embodiment of the present invention.

FIG. 7 is a drawing for explaining discrimination results of a collided object when a vehicle speed signal is not corrected, and when a vehicle speed signal is corrected.

FIG. 9 is a flowchart showing an example of the flow of processings carried out at the collision detection ECU of the collision detecting device relating to the second embodiment of the present invention.

FIG. 10A is a drawing for explaining discrimination results of a collided object when an impulse signal is not corrected and when an impulse signal is corrected, and is a drawing showing a case in which the impulse signal is not corrected.

DESCRIPTION OF EMBODIMENTS

Figure 1:
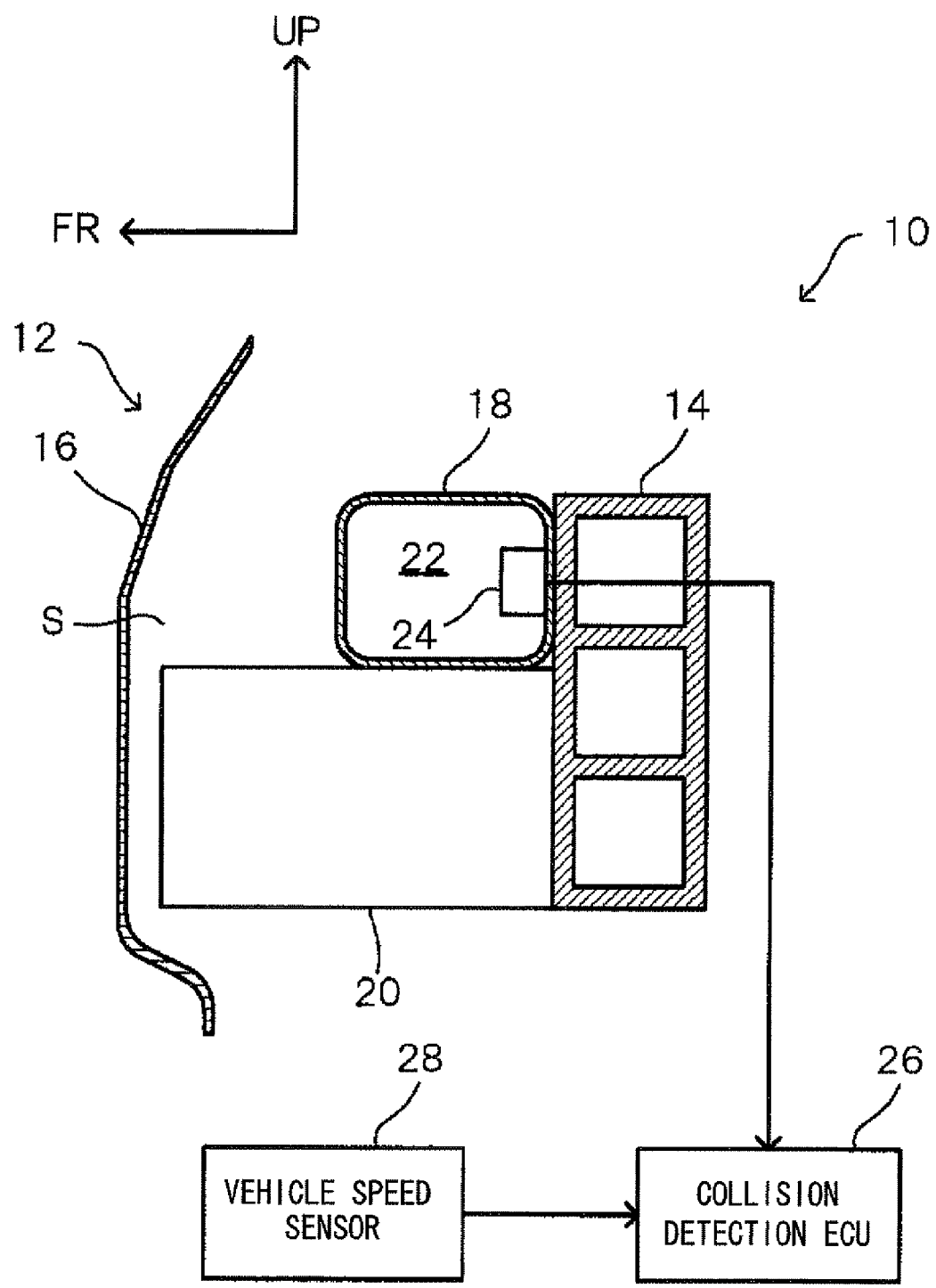
FIG. 1 is a drawing showing the schematic structure of a collision detecting device relating to embodiments of the present invention.

Examples of embodiments of the present invention are described in detail hereinafter with reference to the drawings. FIG. 1 is a drawing showing the schematic structure of a collision detecting device relating to the embodiments of the present invention. Arrow FR shown in the drawing indicates the forward direction in the vehicle longitudinal direction, and arrow UP indicates the upward direction in the vehicle vertical direction.

As shown in FIG. 1, a collision detecting device 10 relating to the embodiments of the present invention discriminates a collided object with a front bumper 12 that is disposed at the front end of an automobile.

The front bumper 12 has a bumper reinforcement 14. The bumper reinforcement 14 is structured from, for example, a material of a metal (iron or aluminum or the like), or a resin material, or the like, and is structured as a skeleton member that is long in the vehicle transverse direction. The bumper reinforcement 14 is supported at the vehicle body so as to span between the front ends at a pair of left and right skeleton members at the vehicle body side that are not shown.

Further, the front bumper 12 has a bumper cover 16 that covers the bumper reinforcement 14 from the outer side in the vehicle longitudinal direction, i.e., the front side. The bumper cover 16 is structured by a resin material or the like, and is supported at the vehicle body at unillustrated portions such that a space S is formed between the bumper cover 16 and the bumper reinforcement 14.

Moreover, a chamber member 18 and an absorber 20 that serves as a buffer member are disposed in the space S between the bumper reinforcement 14 and the bumper cover 16 at the front bumper 12. The chamber member 18 is provided at the upper portion side of the front surface of the bumper reinforcement 14, and the absorber 20 is provided at the lower portion of the front surface of the bumper reinforcement 14.

The absorber 20 is provided along the bumper reinforcement 14 in the vehicle transverse direction, and is structured by a member that is, for example, a foamed member (polypropylene foam or the like). The shape of the absorber 20 is not limited to the sectional shape shown in FIG. 1.

The chamber member 18 structures a pressure chamber 22 that is a hollow structure that is long in the vehicle transverse direction, and is fixed to the upper portion of the front surface of the bumper reinforcement 14.

Further, the chamber member 18 has rigidity such that, in the state in which the chamber member 18 is fixed, at the rear end portion thereof, to the front surface of the bumper reinforcement 14, the hollow shape thereof (the shape of the pressure chamber 22) can be maintained.

Moreover, a pressure sensor 24, that outputs a signal that corresponds to the pressure within the pressure chamber 22, is provided at the collision detecting device 10. The signal outputted from the pressure sensor 24 is outputted to a collision detection ECU 26.

A vehicle speed sensor 28 that detects vehicle speed is connected to the collision detection ECU 26, and a vehicle speed signal detected by the vehicle speed sensor 28 is inputted to the collision detection ECU 26.

The collision detection ECU 26 calculates a discrimination value that is for discriminating the type of the collided object. Concretely, on the basis of a pressure signal from the pressure sensor 24 and the vehicle speed signal, the collision detection ECU 26 estimates a collision physical amount as a discrimination value. More concretely, in a case of input load F, time t, effective mass M and vehicle speed V, because the impulse and the momentum generated by a collision are equal, the relationship MV=Ft is obtained, and the effective mass M=Ft/V. Namely, because the effective mass M can be determined from the impulse and the vehicle speed V, the effective mass is calculated as the discrimination value. Note that, because the load inputted due to the collision corresponds to the change in pressure of the pressure chamber 22, the impulse is determined by time-integrating the pressure signal of the pressure sensor 22.

Further, the collision detection ECU 26 discriminates the collided object on the basis of the effective mass M that serves as the discrimination value. Concretely, when the effective mass M that is determined exceeds a predetermined threshold value, the collision detection ECU 26 discriminates the collided object as a pedestrian. Due thereto, at the collision detecting device 10, it can be discriminated whether a collided object with the front bumper 12 is a pedestrian or is an on-road fixed object such as a roadside marker pole or the like.

Moreover, the collision detection ECU 26 outputs the discrimination results to a pedestrian protecting device or the like. Further, when the discrimination results are that the collided object is a pedestrian, the pedestrian protecting device operates a device for protecting the pedestrian.

Figure 2:
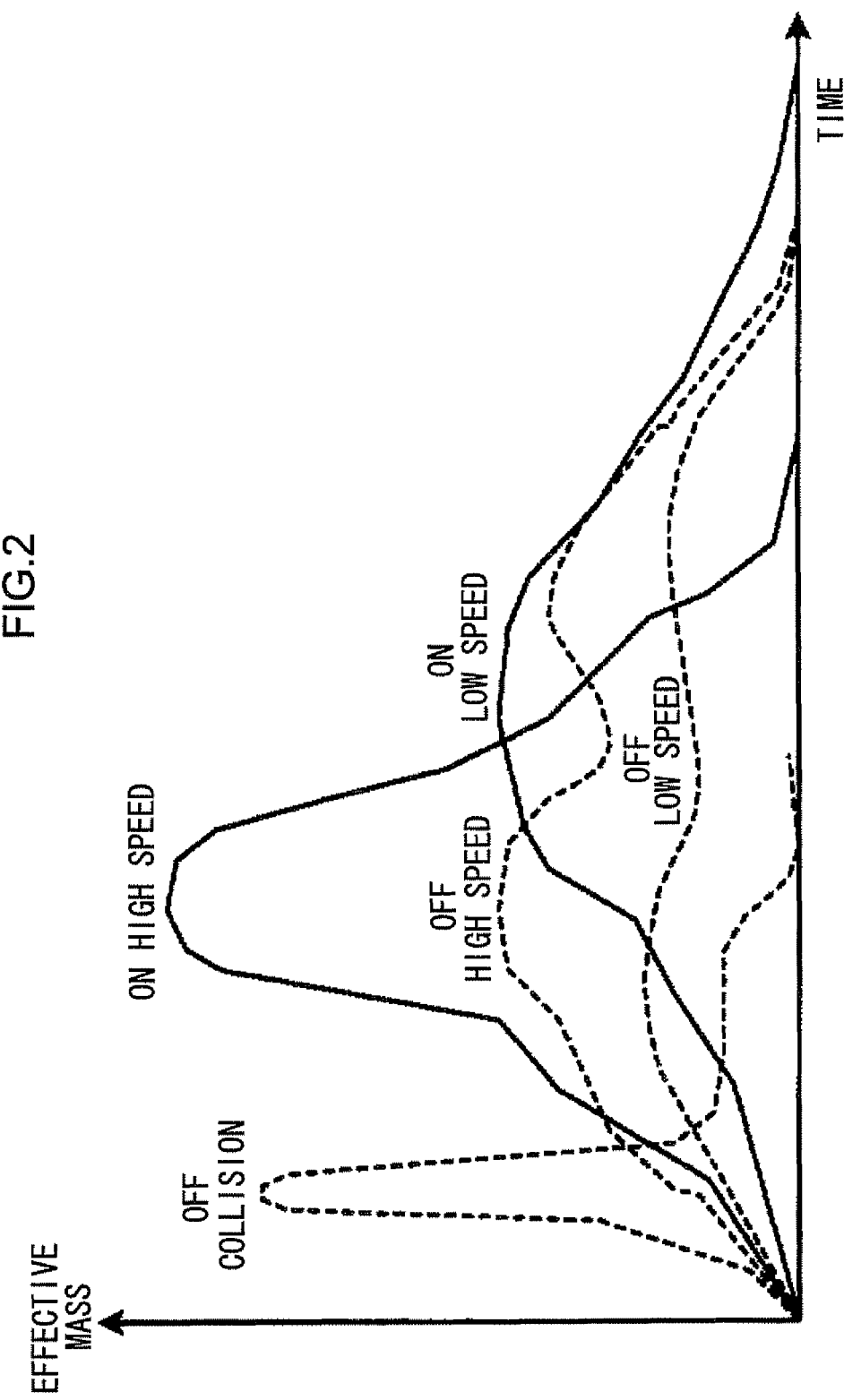
FIG. 2 is a drawing showing examples of the change in pressure within a pressure chamber that is generated by a collision.

By the way, when an attempt is made to discriminate a collided object merely by detecting the pressure value applied to the pressure chamber 22, as shown in FIG. 2, for example, the maximum pressure values of off high speed (collision with an on-road fixed object such as a pole or the like at a predetermined high speed) and on low speed (collision with a pedestrian at a predetermined low speed) hardly differ at all, and therefore, it is difficult to discriminate between a pedestrian and an on-road fixed object. Thus, in the collision detecting device 10 relating to the present embodiment, as described above, the time integrated value of the pressure applied to the pressure chamber 22 is determined as the impulse, and the effective mass is calculated.

However, although the impulse applied to the pressure chamber 22 is determined and the collided object is discriminated, if the entire integrated value of the pressure applied to the pressure chamber 22 is determined when determining the impulse and the collided object is discriminated, for example, the integrated value is small in the case of colliding with a child as compared with the case of an adult. Therefore, it is difficult to discriminate between collision with a child and collision with an on-road fixed object such as a pole or the like.

Thus, in the present embodiment, when determining the impulse, the entire integrated value of the pressure is not determined, and the integrated value of a predetermined sectional integration width (time) is determined and the collided object is discriminated. The sectional integration width of a predetermined section may be a predetermined sectional integration width, or may vary in accordance with the vehicle speed.

Figure 3A:
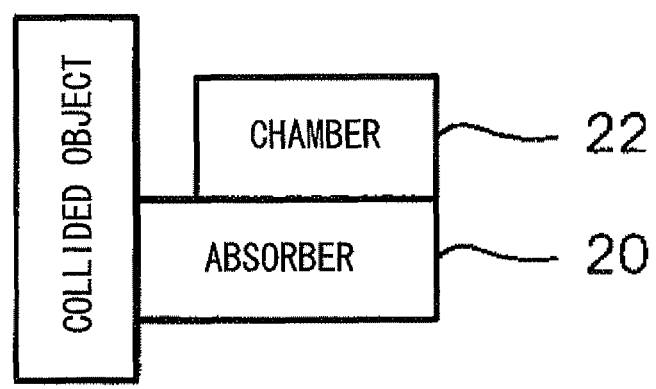
FIG. 3A is a drawing showing a case in which only an absorber deforms.
Figure 3B:
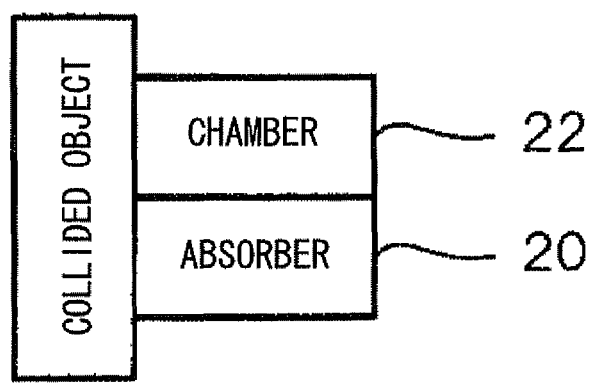
FIG. 3B is a drawing showing a case in which the pressure chamber deforms.
Figure 3C:
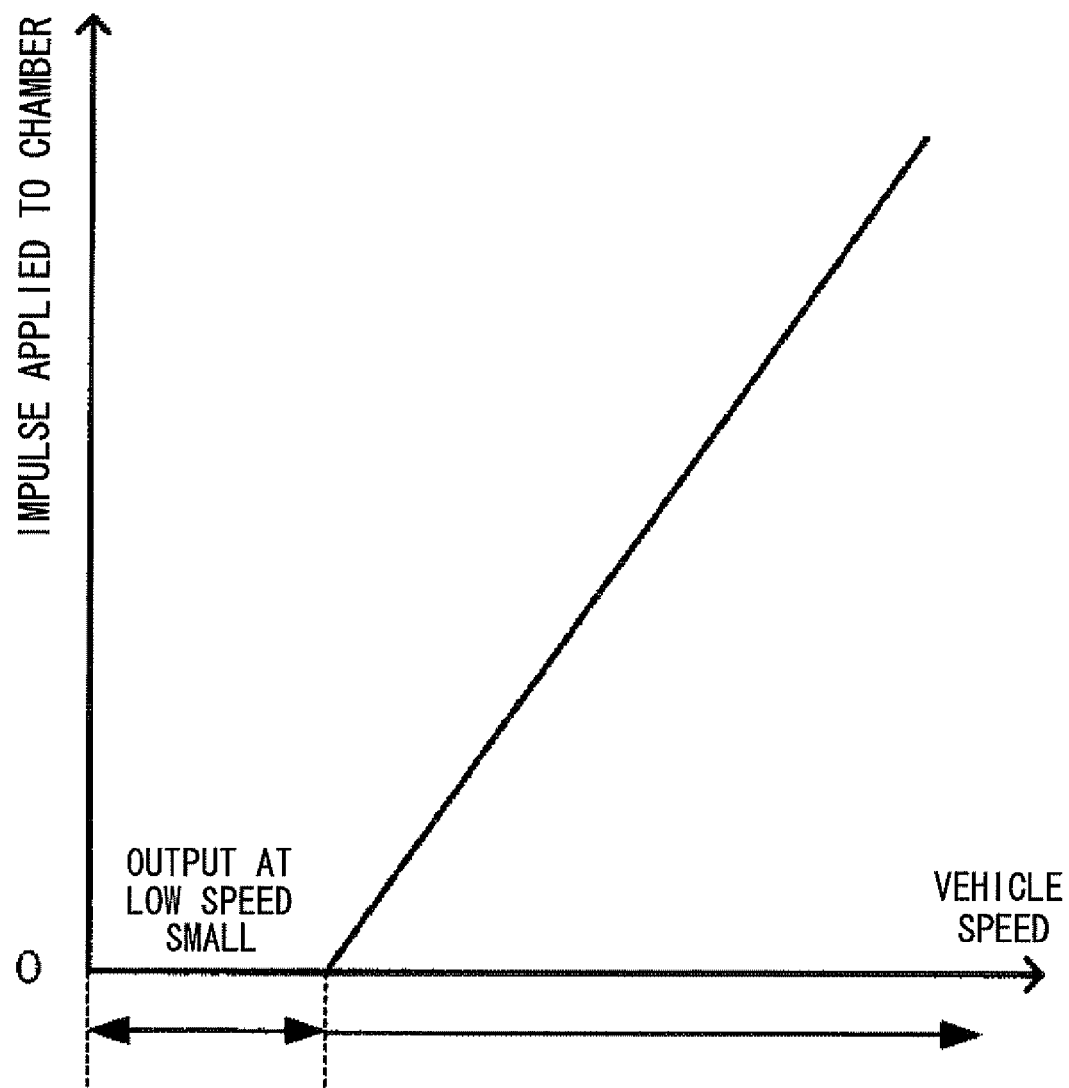
FIG. 3C is a drawing for explaining a dead zone of a pressure sensor.

Moreover, as described above, the collision detecting device 10 relating to the present embodiment discriminates the collided object on the basis of change in pressure of the pressure chamber 22. However, because the space S and the absorber 20 are interposed between the bumper cover 16 and the pressure chamber 22, as shown in FIG. 3A, even if the bumper cover 16 collides with a collided object, only the absorber 20 deforms and a change in pressure does not arise at the pressure chamber 22, and, as shown in FIG. 3B, a change in pressure arises at the pressure chamber 22 when the collided object penetrates further in. Accordingly, as shown in FIG. 3C, there is a dead zone at the pressure sensor 22, and output at times of low speed is small, and the effective mass at times of a low-speed collision is small, and it is difficult to discriminate it as a pedestrian collision.

Thus, at the collision detection ECU 26 of the present embodiment, on the basis of the energy needed from the bumper cover 16 deforming until the pressure chamber 22 deforms, the portion of the dead zone of the pressure sensor 22 is corrected, and the collided object is discriminated.

Structural examples of the collision detection ECU 26 are described in detail hereinafter.

First Embodiment

Figure 4A:
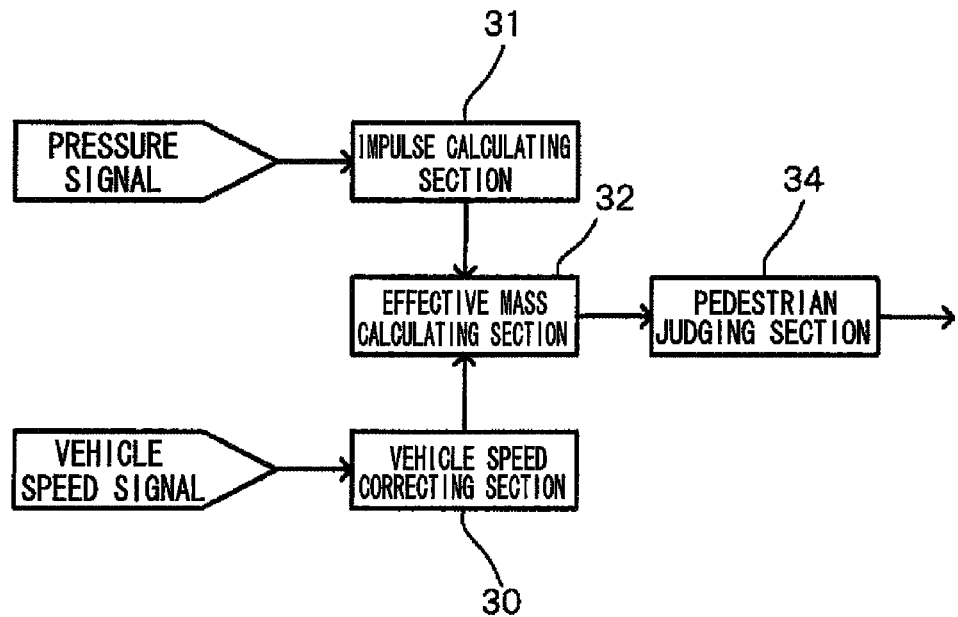
FIG. 4A is a functional block diagram showing functions of a collision detection ECU of the collision detecting device relating to embodiments of the present invention.

First, the schematic structure of the collision detection ECU 26 in the collision detecting device 10 relating to a first embodiment of the present invention is described. FIG. 4A is a functional block diagram showing functions of the collision detection ECU 26 of the collision detecting device 10 relating to the first embodiment of the present invention.

The collision detection ECU 26 has the functions of a vehicle speed correcting section 30, an impulse calculating section 31, an effective mass calculating section 32, and a pedestrian judging section 34.

The vehicle speed signal detected by the vehicle speed sensor 28 is inputted to the vehicle speed correcting section 30. By using a predetermined vehicle speed conversion map or the like, the vehicle speed correcting section 30 determines a converted vehicle speed signal, that is obtained by subtracting a predetermined value α from the vehicle speed signal of the vehicle speed sensor 28, and outputs the converted vehicle speed signal to the effective mass calculating section 32.

Figure 4B:
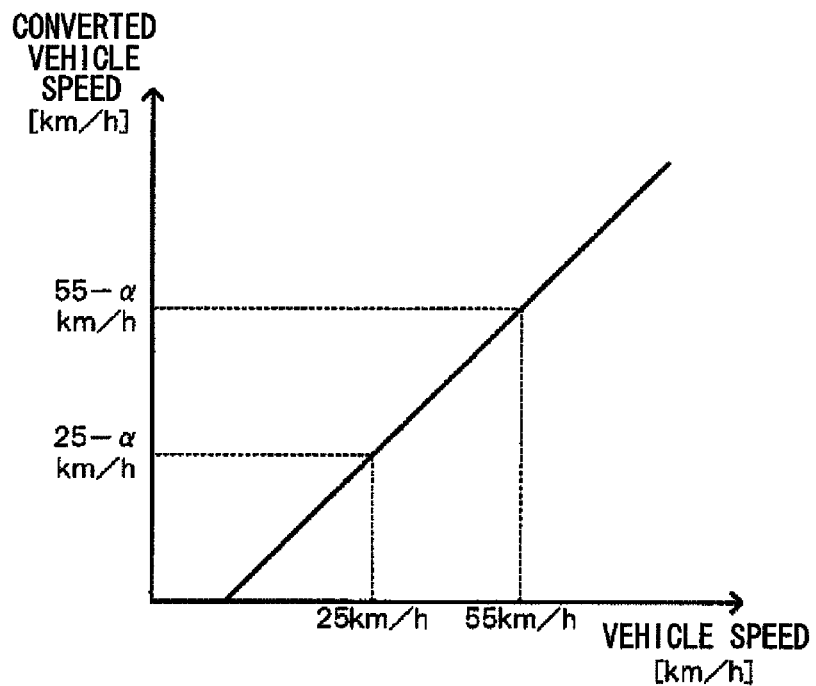
FIG. 4B is a drawing showing a vehicle speed converting map.

The vehicle speed conversion map is a map that determines the converted vehicle speed that is obtained by subtracting a predetermined value with respect to the vehicle speed signal detected by the vehicle speed sensor 28, and the vehicle speed conversion map shown in FIG. 4B can be used for example. Note that the vehicle speed map may be a look-up table in which converted vehicle speeds with respect to vehicle speed signals detected by the vehicle speed sensor 28 are stored in advance, or may be a computation formula that subtracts the predetermined value α from the vehicle speed signal detected by the vehicle speed sensor 28.

Further, the pressure signal detected by the pressure sensor 25 is inputted to the impulse calculating section 31, and an impulse signal, that is obtained by time-integrating the pressure signal detected by the pressure sensor 24, is calculated. At this time, the pressure signal is time-integrated at a predetermined sectional integration width that is determined in advance, and the calculated impulse signal is outputted to the effective mass calculating section 32.

The impulse signal calculated by the impulse calculating section 31 is inputted to the effective mass calculating section 32, and the vehicle speed signal is inputted from the vehicle speed correcting section 30. On the basis of the inputted impulse signal and vehicle speed signal, the effective mass calculating section 32 calculates the effective mass, and outputs the calculation results to the pedestrian judging section 34. Concretely, the effective mass is calculated by effective mass [kg]=impulse [N/s]/converted vehicle speed [km/h]× 3.6. Note that the 3.6 is a value in accordance with unit conversion.

The pedestrian judging section 34 judges whether or not the effective mass calculated by the effective mass calculating section 32 is greater than or equal to a predetermined threshold value. When this judgment is affirmative, the collided object is discriminated as a pedestrian, and, when the judgment is negative, the collided object is discriminated as an on-road fixed object other than a pedestrian. Then, the discrimination results are outputted to a device such as a pedestrian protecting device or the like.

Next, the flow of processings that are carried out at the collision detection ECU 26 of the collision detecting device 10 relating to the first embodiment of the present invention that is structured as described above, is described. FIG. 5 is a flowchart showing an example of the flow of processings carried out at the collision detection ECU 26 of the collision detecting device 10 relating to the first embodiment of the present invention.

First, in step 100, the pressure signal detected by the pressure sensor 24 is inputted to the collision detection ECU 26, and the routine moves on to step 102.

In step 102, it is judged, by the collision detection ECU 26, whether or not there is a change in pressure of the pressure chamber 22. This judgment judges whether or not there is a change in the detection results of the pressure signal, and when this judgment is negative, the routine returns to step 100 and the pressure of the pressure chamber 22 is again detected. When the judgment is affirmative, the routine moves on to step 104.

In step 104, the integrated value of the pressure signal is calculated at a predetermined sectional integration width by the collision detection ECU 26, and the routine moves on to step 106. Namely, the impulse is calculated due to the impulse calculating section 31 integrating the pressure signal at a predetermined sectional integration width.

In step 106, the vehicle speed signal detected by the vehicle speed sensor 28 is inputted to the collision detection ECU 26, and the routine moves on to step 108.

In step 108, the vehicle speed signal is corrected by the collision detection ECU 26, and the routine moves on to step 110. Namely, as described above, the converted vehicle speed signal, that is obtained by subtracting a predetermined value from the vehicle speed signal detected by the vehicle speed sensor 28, is calculated by the vehicle speed correcting section 30.

In step 110, the effective mass of the collided object is calculated by the collision detection ECU 26, and the routine moves on to step 112. Namely, the effective mass of the collided object is calculated by the effective mass calculating section 32 on the basis of the vehicle speed signal corrected by the vehicle speed correcting section 30, and the impulse signal calculated in step 104.

In step 112, it is judged, by the pedestrian judging section 34, whether or not the calculated effective mass is greater than or equal to a threshold value. When this judgment is affirmative, the routine moves on to step 114, and, when this judgment is negative, the routine moves on to step 116.

In step 114, the collided object is discriminated as a pedestrian, and the routine moves on to step 118. In step 116, the collided object is discriminated as an on-road fixed object other than a pedestrian, and the routine moves on to step 118. Note that, in step 116, although the collided object is discriminated as an on-road fixed object, it is not limited to an on-road fixed object, and may be discriminated as an object other than a pedestrian.

In step 118, the discrimination results are outputted to a device such as a pedestrian protecting device or the like, and the series of processings ends.

Figure 6A:
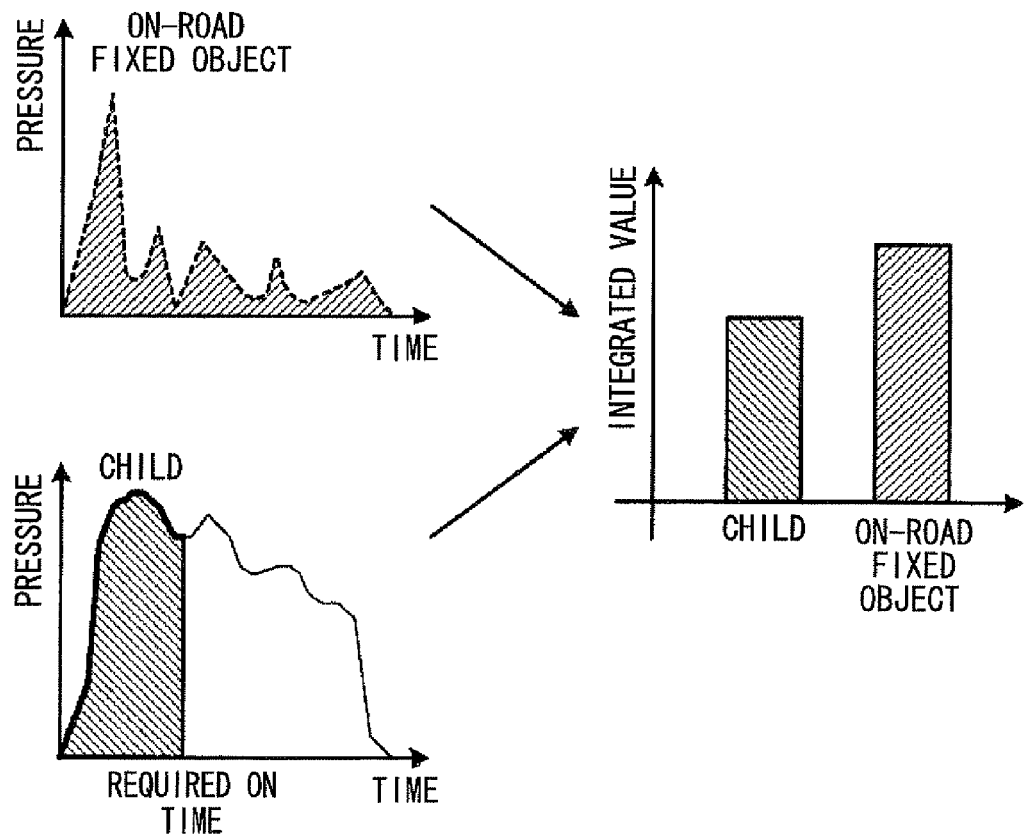
FIG. 6A is a drawing showing changes in pressure with respect to the passage of time when the collided object is an on-road fixed object such as a pole or the like, changes in pressure with respect to the passage of time when the collided object is a child, and the entire integrated values of the respective pressures when the collided object is a child and when the collided object is an on-road fixed object.
Figure 6B:
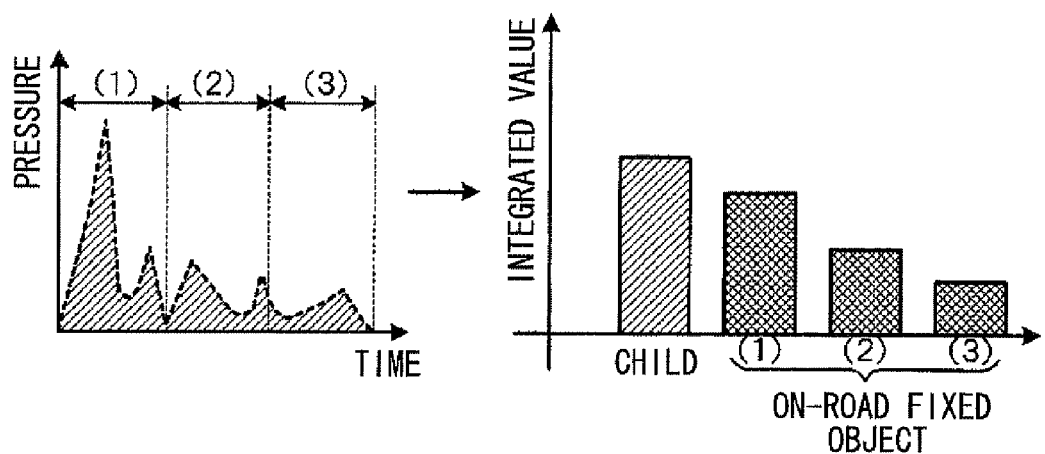
FIG. 6B is a drawing showing an example of sectional integration width in the case of sectional integration, and examples of respective integrated values in the case of sectional integration.

By the way, when the impulse that is applied to the pressure chamber 22 is calculated as described above, if the entire pressure signal is integrated, it is difficult to discriminate between a collision with an on-road fixed object, such as a pole or the like, and with a child. For example, as shown in FIG. 6A, when the respective entire integrated values (in the case of a child, the entire integrated value until the necessary on time (the time from collision with the bumper until collision with the hood, or the like)) are computed for each of a change in pressure with respect to the passage of time when the collided object is an on-road fixed object such as a pole or the like and a change in pressure with respect to the passage of time when the collided object is a child, the integrated value of the on-road fixed object such as a pole or the like is greater, and, if the threshold value is set so as to suit the case of a child, an on-road fixed object also is discriminated as a pedestrian. In contrast, in the present embodiment, because the integrated value of the pressure signal of a predetermined sectional integration width is calculated, as shown in FIG. 6B, an on-road fixed object is integrated sectionally as shown by (1) through (3) in FIG. 6 for example, and is values that are smaller than the integrated value in the case of a child, and it is possible to discriminate between an on-road fixed object and a child, and the collided object can be discriminated accurately.

Further, in the present embodiment, by correcting the vehicle speed signal, the dead zone of the pressure sensor 24 due to the space S and the absorber 20 and the like between the bumper cover 16 and the pressure chamber 22, is corrected. Due thereto, it is possible to accurately discriminate the object of the collision such as a pedestrian or the like.

FIG. 7 is a drawing for explaining discrimination results of a collided object when the vehicle speed signal is not corrected and when the vehicle speed signal is corrected.

The actual vehicle speed shown by the solid line in FIG. 7 expresses the threshold value when the collided object is discriminated without correcting the vehicle speed signal, and the converted vehicle speed shown by the dashed line expresses the threshold value when the vehicle speed signal is corrected and the collided object is discriminated. Further, the plots and the solid lines at vehicle speeds of 25 [km/h], 40 [km/h], 55 [km/h] in FIG. 5 are evaluations of the overall dispersion of the vehicle. Further, the region shown by the one-dot chain line in FIG. 5 (on collision output) is a region discriminated as a pedestrian, and (off collision output) shown by the dashed line is a region discriminated to be other than a pedestrian.

As shown in FIG. 7, it can be understood that, when the vehicle speed is not corrected, although the collided object must be discriminated as a pedestrian in accordance with the dispersion at vehicle speeds of 25 [km/h] and 40 [km/h], there is the possibility of it being discriminated as other than a pedestrian, but by correcting the vehicle speed, the collided object can be discriminated accurately including the dispersion.

Second Embodiment

Figure 8A:
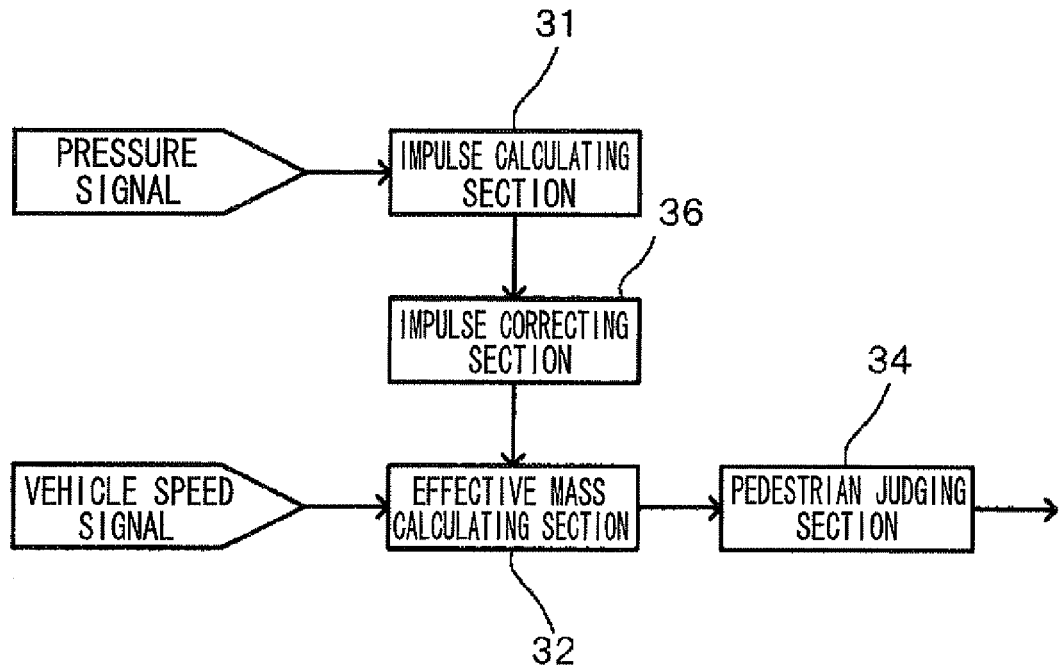
FIG. 8A is a functional block diagram showing functions of a collision detection ECU of a collision detecting device relating to a second embodiment of the present invention.

The collision detection ECU 26 of the collision detecting device relating to a second embodiment of the present invention is described next. FIG. 8A is a functional block diagram showing functions of the collision detection ECU 26 in the collision detecting device 10 relating to the second embodiment of the present invention.

In the first embodiment, the vehicle speed is corrected as the method of correcting the discrimination value for discriminating the collided object, but, in the present embodiment, the impulse is corrected, i.e., the time integrated value of the pressure signal is corrected. Note that description is given with structures that are the same as the first embodiment being denoted by the same reference numerals.

The collision detection ECU 26 relating to the present embodiment has the functions of the impulse calculating section 31, an impulse correcting section 36, the effective mass calculating section 32, and the pedestrian discriminating section 34.

The impulse calculating section 31 calculates an impulse signal that is obtained by time-integrating the pressure signal detected by the pressure sensor 24. At this time, the pressure signal is time-integrated at a predetermined sectional integration width that is determined in advance, and the calculated impulse signal is outputted to the impulse correcting section 36.

The impulse signal calculated by the impulse calculating section 31 is inputted to the impulse correcting section 36. By using a predetermined impulse correction map or the like, the impulse correcting section 36 determines an impulse correction signal, that is obtained by adding a predetermined value to the impulse signal, and outputs the impulse correction signal to the effective mass calculating section 32.

Figure 8B:
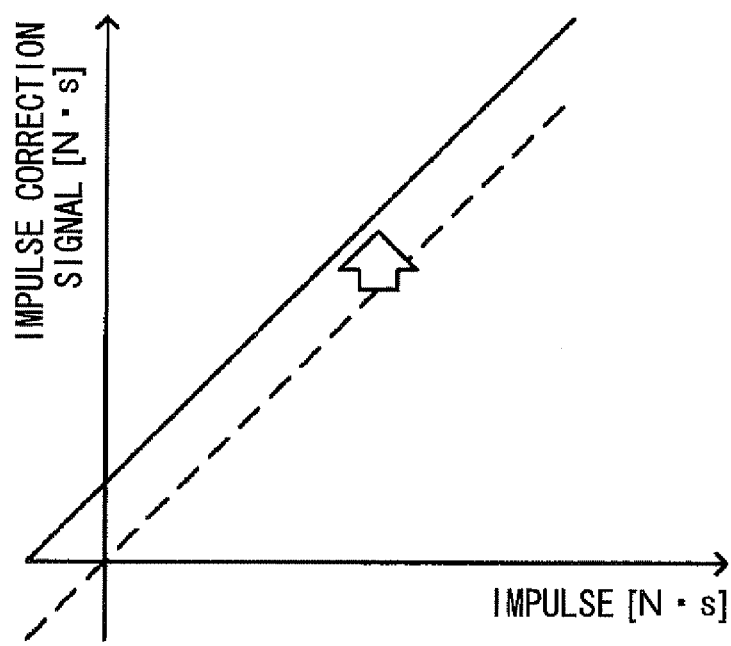
FIG. 8B is a drawing showing an impulse correction map.

The impulse correction map is a map that determines the impulse correction signal that is obtained by adding a predetermined value to the impulse signal, and as shown in FIG. 8B for example, a map that determines impulse correction signals shown by the dashed line with respect to actual impulse signals shown by the straight line can be used. Note that the impulse correction map may be a look-up table in which impulse correction signals with respect to impulse signals are stored in advance, or may be a computation formula that adds a predetermined value to the impulse signal.

Further, the impulse correction signal is inputted from the impulse correcting section 36 to the effective mass calculating section 32, and the vehicle speed signal detected by the vehicle speed sensor 28 is inputted to the effective mass calculating section 32. On the basis of the inputted impulse correction signal and vehicle speed signal, the effective mass calculating section 32 calculates the effective mass, and outputs the calculation results to the pedestrian judging section 34. Concretely, the effective mass is calculated by effective mass [kg]=impulse correction value [N/s]/vehicle speed [km/h]×3.6. Note that the 3.6 is a value in accordance with unit conversion.

The pedestrian judging section 34 judges whether or not the effective mass calculated by the effective mass calculating section 32 is greater than or equal to a predetermined threshold value. When this judgment is affirmative, the collided object is discriminated as a pedestrian, and, when the judgment is negative, the collided object is discriminated as an on-road fixed object other than a pedestrian. Then, the discrimination results are outputted to a device such as a pedestrian protecting device or the like.

Next, the flow of processings that are carried out at the collision detection ECU 26 of the collision detecting device 10 relating to the second embodiment of the present invention that is structured as described above, is described. FIG. 9 is a flowchart showing an example of the flow of processings carried out at the collision detection ECU 26 of the collision detecting device 10 relating to the second embodiment of the present invention. Note that description is given with processings that are the same as the first embodiment being denoted by the same reference numerals.

First, in step 100, the pressure signal detected by the pressure sensor 24 is inputted to the collision detection ECU 26, and the routine moves on to step 102.

In step 102, it is judged, by the collision detection ECU 26, whether or not there is a change in pressure of the pressure chamber 22. This judgment judges whether or not there is a change in the detection results of the pressure signal, and when this judgment is negative, the routine returns to step 100 and the pressure of the pressure chamber 22 is again detected. When the judgment is affirmative, the routine moves on to step 104.

In step 104, the integrated value of the pressure signal is calculated at a predetermined sectional integration width by the collision detection ECU 26, and the routine moves on to step 106. Namely, the impulse is calculated due to the impulse calculating section 31 integrating the pressure signal at a predetermined sectional integration width.

In step 105, the impulse signal is corrected by the collision detection ECU 26, and the routine moves on to step 106. Namely, as described above, the impulse correction signal, that is obtained by adding a predetermined value to the impulse signal, is calculated by the impulse correcting section 36.

In step 106, the vehicle speed signal detected by the vehicle speed sensor 28 is inputted to the collision detection ECU 26, and the routine moves on to step 110.

In step 110, the effective mass of the collided object is calculated by the collision detection ECU 26, and the routine moves on to step 112. Namely, the effective mass of the collided object is calculated by the effective mass calculating section 32 on the basis of the vehicle speed signal detected by the vehicle speed sensor 28, and the impulse correction signal corrected by the impulse correcting section 36.

In step 112, it is judged, by the pedestrian judging section 34, whether or not the calculated effective mass is greater than or equal to a threshold value. When this judgment is affirmative, the routine moves on to step 114, and, when this judgment is negative, the routine moves on to step 116.

In step 114, the collided object is discriminated as a pedestrian, and the routine moves on to step 118. In step 116, the collided object is discriminated as an on-road fixed object other than a pedestrian, and the routine moves on to step 118. Note that, in step 116, although the collided object is discriminated as an on-road fixed object, it is not limited to an on-road fixed object, and may be discriminated as an object other than a pedestrian.

In step 118, the discrimination results are outputted to a device such as a pedestrian protecting device or the like, and the series of processings ends.

Namely, in the present embodiment as well, in the same way as the first embodiment, the entire integrated value of the pressure signal is not calculated, and the integrated value is calculated at a predetermined sectional integration width, and therefore, the collided object can be discriminated accurately.

Further, in the present embodiment, by correcting the impulse signal, the dead zone of the pressure sensor 24 due to the space S and the absorber 20 and the like between the bumper cover 16 and the pressure chamber 22, is corrected. Due thereto, it is possible to accurately discriminate the object of the collision such as a pedestrian or the like.

Figure 10B:
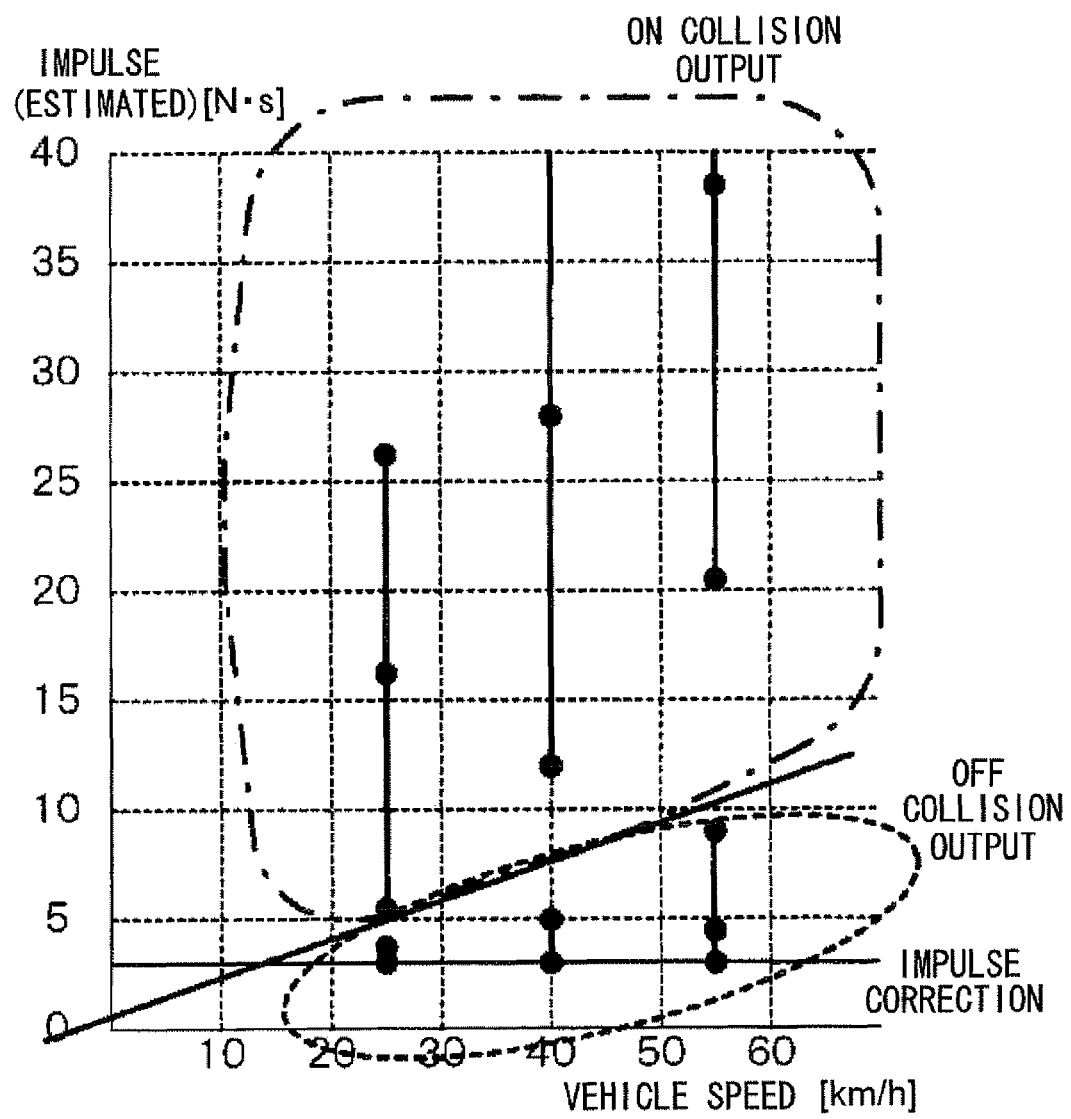
FIG. 10B is a drawing for explaining discrimination results of a collided object when an impulse signal is not corrected and when an impulse signal is corrected, and is a drawing showing a case in which the impulse signal is corrected.

FIG. 10A is a drawing for explaining discrimination results of a collided object when the impulse signal is not corrected and when the impulse signal is corrected, and shows a case in which the impulse signal is not corrected, and FIG. 10B shows a case in which the impulse signal is corrected. Further, the plots and the solid lines at vehicle speeds of 25 [km/h], 40 [km/h], 55 [km/h] in FIGS. 10A, 10B are evaluations of the overall dispersion of the vehicle. Further, the region shown by the one-dot chain line in the drawings (on collision output) is a region discriminated as a pedestrian, and the region shown by the dashed line (off collision output) is a region discriminated to be other than a pedestrian.

When the impulse signal is not corrected, as shown in FIG. 10A, although the collided object must be discriminated as a pedestrian in accordance with the dispersion at a vehicle speed of 25 [km/h], there is the possibility of it being discriminated as other than a pedestrian. Further, although the collided object must be discriminated as other than a pedestrian in accordance with the dispersion at a vehicle speed of 55 [km/h], there is the possibility of it being discriminated as a pedestrian.

In contrast therewith, it can be understood that, when the impulse is corrected, the collided object can be discriminated accurately including the dispersion, as shown in FIG. 10B.

Third Embodiment

Next, the collision detection ECU 26 of the collision detecting device relating to a third embodiment of the present invention is described.

In the above-described embodiment, the impulse is calculated by calculating the integrated value of the pressure signal at a predetermined sectional integration width, and the collided object is discriminated. However, in the present embodiment, the sectional integration width is changed in accordance with the vehicle speed. Note that, hereinafter, an example is described in which the sectional integration width is changed in accordance with the vehicle speed with respect to the first embodiment, but the sectional integration width may be changed in accordance with the vehicle speed with respect to the second embodiment.

Figure 11A:
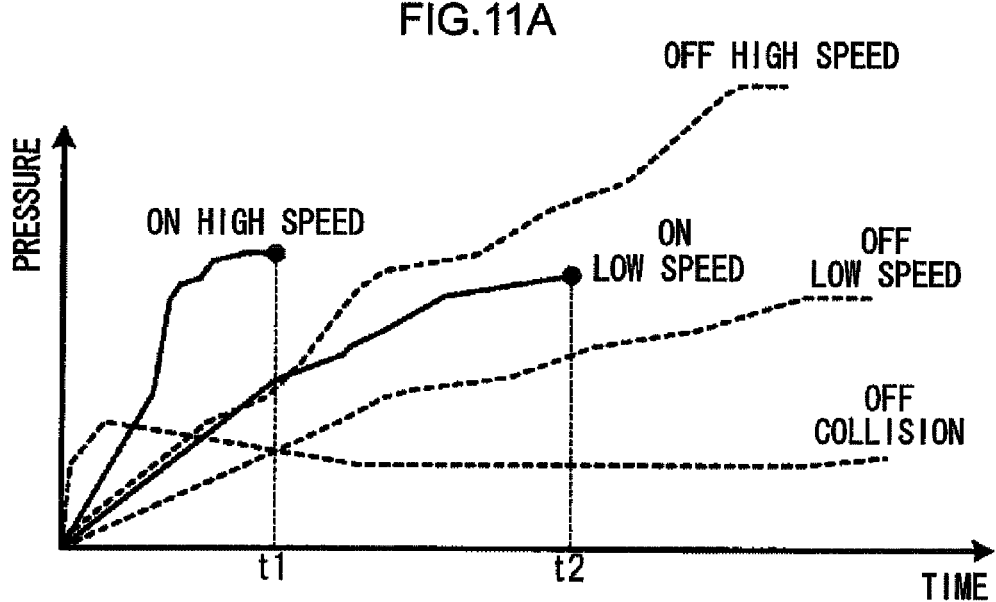
FIG. 11A is a drawing showing pressure within a pressure chamber 22 with respect to the passage of time, for each of on high speed, off high speed, on low speed, off low speed, and off collision.

FIG. 11A shows pressure within the pressure chamber 22 with respect to the passage of time, for each of on high speed, off high speed, on low speed, off low speed, and off collision. Note that on high speed expresses a case of colliding with a pedestrian at a predetermined high speed, off high speed expresses a case of colliding with an on-road fixed object at a predetermined high speed, on low speed expresses a case of colliding with a pedestrian at a predetermined low speed, off low speed expresses a case of colliding with an on-road fixed object at a predetermined low speed, and off collision expresses cases of other collisions.

The integrated value up to required time (t1) at the time of on high speed is smaller than the entire integrated value at the time of off high speed. The integrated value up to required time (t2) at the time of low speed on also is smaller than the entire integrated value at the time of off high speed. However, by integrating at a predetermined sectional integration width as described in the first, second embodiments, collisions with a pedestrian and with a collided object other than a pedestrian (e.g., an on-road fixed object) can be discriminated. However, as can be understood from FIG. 11A, the required time (t1) at the time of on high speed and the required time (t2) at the time of on low speed are respectively different times, and the integrated value until the required time (t2) at the time of on low speed is smaller than the integrated value until t2 at the time of off high speed. Therefore, the integrated value up to the on required timing (e.g., the time from a pedestrian colliding with the bumper until the pedestrian collides with the hood, or the like) must be used at each vehicle speed. Namely, by using a sectional integration width that corresponds to the vehicle speed, collisions with a pedestrian and with a collided object other than a pedestrian (e.g., an on-road fixed object) can be discriminated.

Thus, in the present embodiment, the sectional integration width (time) is changed in accordance with the vehicle speed, and integration of the pressure signal is carried out, and the impulse is calculated.

Figure 11B:
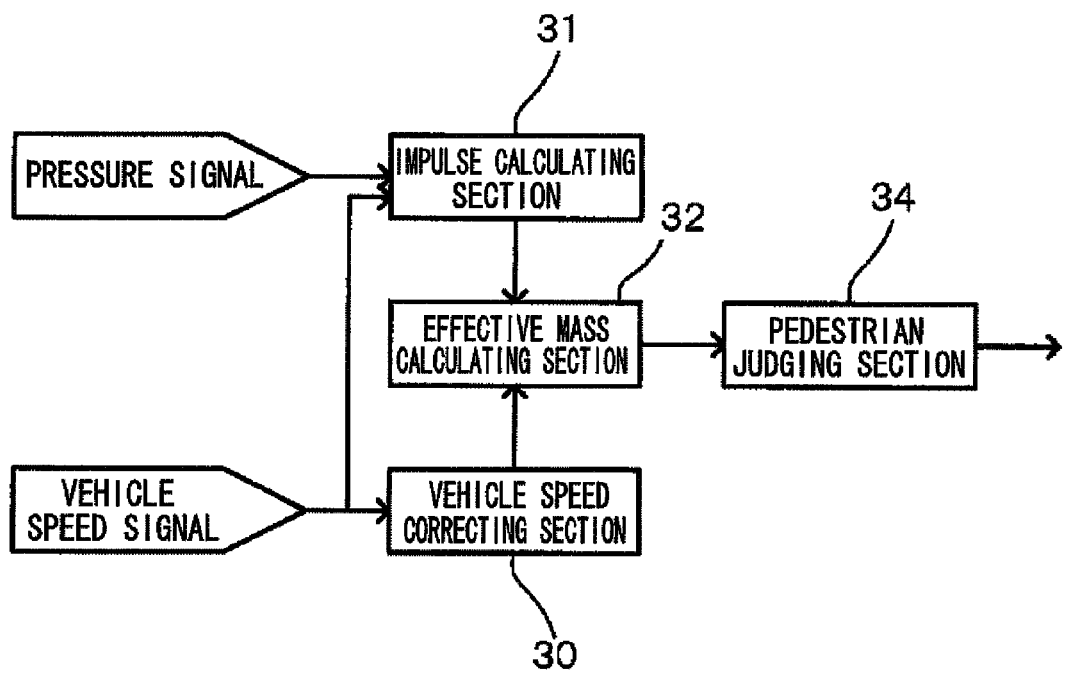
FIG. 11B is a functional block diagram showing functions of a collision detection ECU of a collision detecting device relating to a third embodiment of the present invention.

FIG. 11B is a functional block diagram showing functions of the collision detection ECU 26 of the collision detecting device relating to the third embodiment of the present invention. Note that description is given with structures that are the same as the first embodiment being denoted by the same reference numerals.

The collision detection ECU 26 of the present embodiment has the functions of the vehicle speed correcting section 30, the impulse calculating section 31, the effective mass calculating section 32, and the pedestrian judging section 34.

The vehicle speed signal detected by the vehicle speed sensor 28 is inputted to the vehicle speed correcting section 30. By using a predetermined vehicle speed conversion map or the like, the vehicle speed correcting section 30 determines a converted vehicle speed signal, that is obtained by subtracting a predetermined value α from the vehicle speed signal of the vehicle speed sensor 28, and outputs the converted vehicle speed signal to the effective mass calculating section 32.

The vehicle speed conversion map is a map that determines the converted vehicle speed that is obtained by subtracting a predetermined value with respect to the vehicle speed signal detected by the vehicle speed sensor 28, and the vehicle speed conversion map shown in FIG. 4B can be used for example. Note that the vehicle speed map may be a look-up table in which converted vehicle speeds with respect to vehicle speed signals detected by the vehicle speed sensor 28 are stored in advance, or may be a computation formula that subtracts the predetermined value α from the vehicle speed signal detected by the vehicle speed sensor 28.

Further, the impulse calculating section 31 calculates an impulse signal that is obtained by time-integrating the pressure signal detected by the pressure sensor 24. At this time, in the present embodiment, the vehicle speed signal detected by the vehicle speed sensor 28 is inputted to the impulse calculating section 31, and a map for deciding upon a predetermined sectional integration width in accordance with the vehicle speed is stored, and a sectional integration width is decided upon in accordance with the vehicle speed, and an integrated value calculated by carrying out time integration of the pressure signal is outputted to the effective mass calculating section 32 as an impulse signal.

Figure 11C:
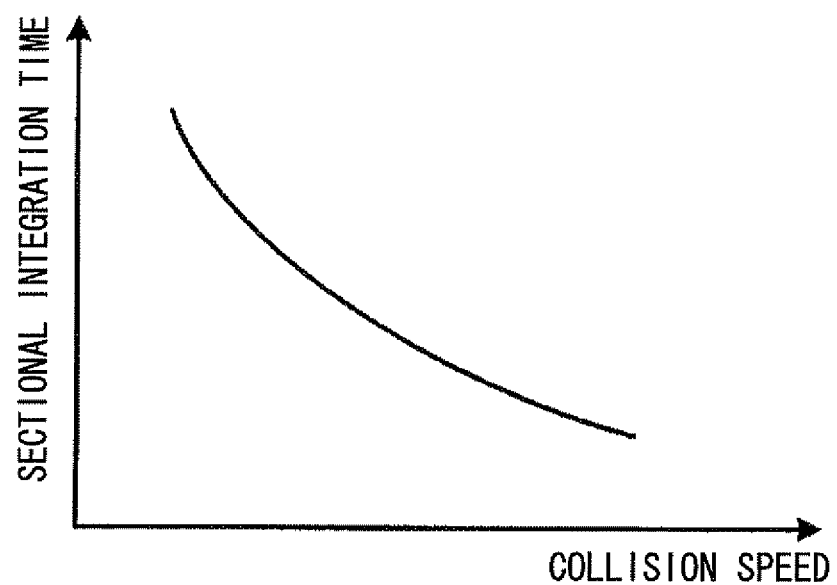
FIG. 11C is a drawing showing an example of a map for deciding upon a sectional integration width from a vehicle speed signal.

As the map for deciding upon the sectional integration width from the vehicle speed signal, for example, a map such that there is a sectional integration width (time) that is inversely proportional to the collision vehicle speed as shown in FIG. 11C is stored in advance, and the sectional integration width that corresponds to the vehicle speed is decided upon. Note that, provided that the sectional integration width becomes shorter as the vehicle speed becomes faster, the sectional integration widths are not limited to the map of FIG. 11C, and may be rectilinear, or may be step-shaped, or may be another curve.

The impulse signal calculated by the impulse calculating section 31 is inputted to the effective mass calculating section 32, and the vehicle speed signal is inputted from the vehicle speed correcting section 30. On the basis of the inputted impulse signal and vehicle speed signal, the effective mass calculating section 32 calculates the effective mass, and outputs the calculation results to the pedestrian judging section 34. Concretely, the effective mass is calculated by effective mass [kg]=impulse [N/s]/converted vehicle speed [km/h]× 3.6. Note that the 3.6 is a value in accordance with unit conversion.

The pedestrian judging section 34 judges whether or not the effective mass calculated by the effective mass calculating section 32 is greater than or equal to a predetermined threshold value. When this judgment is affirmative, the collided object is discriminated as a pedestrian, and, when the judgment is negative, the collided object is discriminated as an on-road fixed object other than a pedestrian. Then, the discrimination results are outputted to a device such as a pedestrian protecting device or the like. Note that, in the present embodiment, discrimination of a collided object is prohibited outside of a predetermined range of vehicle speeds.

Figure 12:
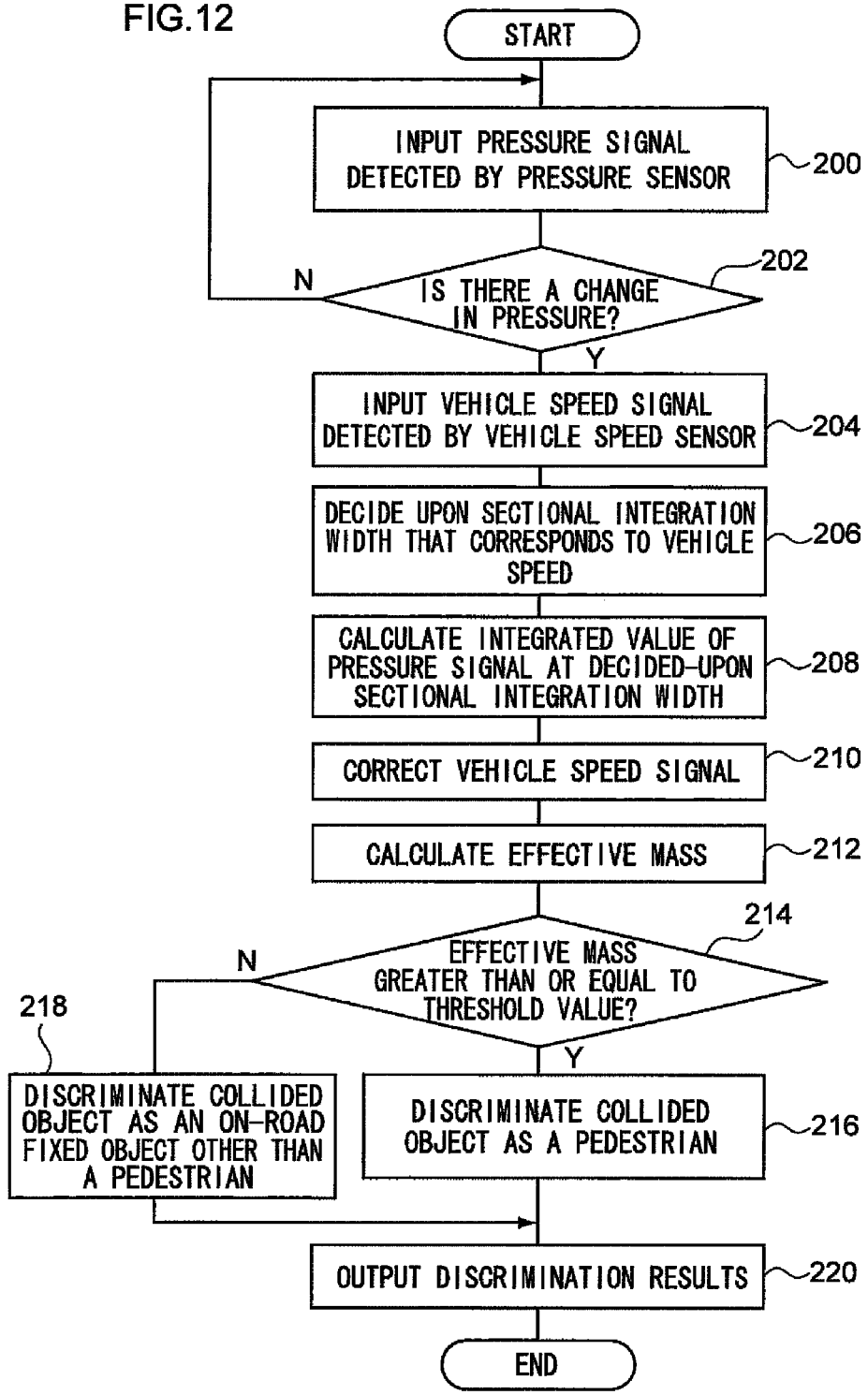
FIG. 12 is a flowchart showing an example of the flow of processings carried out at the collision detection ECU of the collision detecting device relating to the third embodiment of the present invention.

Next, the flow of processings that are carried out at the collision detection ECU 26 of the collision detecting device 10 relating to the third embodiment of the present invention that is structured as described above, is described. FIG. 12 is a flowchart showing an example of the flow of processings carried out at the collision detection ECU 26 of the collision detecting device 10 relating to the third embodiment of the present invention.

First, in step 200, the pressure signal detected by the pressure sensor 24 is inputted to the collision detection ECU 26, and the routine moves on to step 202.

In step 202, it is judged, by the collision detection ECU 26, whether or not there is a change in pressure of the pressure chamber 22. This judgment judges whether or not there is a change in the detection results of the pressure signal, and when this judgment is negative, the routine returns to step 200 and the pressure of the pressure chamber 22 is again detected. When the judgment is affirmative, the routine moves on to step 204.

In step 204, the vehicle speed signal detected by the vehicle speed sensor 28 is inputted to the collision detection ECU 26, and the routine moves on to step 206.

In step 206, a sectional integration width is decided upon in accordance with the vehicle speed, and the routine moves on to step 208. Namely, the sectional integration width is decided upon by the impulse calculating section 31 determining the sectional integration width that corresponds to the vehicle speed signal, from the map for deciding upon a predetermined sectional integration width in accordance with vehicle speed.

In step 208, the integrated value of the pressure signal is calculated by the collision detection ECU 26 at the sectional integration width that was decided upon, and the routine moves on to step 210. Namely, the impulse is calculated by the impulse calculating section 31 integrating the pressure signal at the sectional integration width that was decided upon in step 206.

In step 210, the vehicle speed signal is corrected by the collision detection ECU 26, and the routine moves on to step 212. Namely, as described in the first embodiment, the converted vehicle speed signal, that is obtained by subtracting a predetermined value from the vehicle speed signal detected by the vehicle speed sensor 28, is calculated by the vehicle speed correcting section 30.

In step 212, the effective mass of the collided object is calculated by the collision detection ECU 26, and the routine moves on to step 214. Namely, the effective mass of the collided object is calculated by the effective mass calculating section 32 on the basis of the vehicle speed signal corrected by the vehicle speed correcting section 30, and the impulse signal calculated in step 208.

In step 214, it is judged, by the pedestrian judging section 34, whether or not the calculated effective mass is greater than or equal to a threshold value. When this judgment is affirmative, the routine moves on to step 216, and, when this judgment is negative, the routine moves on to step 218.

In step 216, the collided object is discriminated as a pedestrian, and the routine moves on to step 220. In step 218, the collided object is discriminated as an on-road fixed object other than a pedestrian, and the routine moves on to step 220. Note that, in step 218, although the collided object is discriminated as an on-road fixed object, it is not limited to an on-road fixed object, and may be discriminated to be an object other than a pedestrian.

In step 220, the discrimination results are outputted to a device such as a pedestrian protecting device or the like, and the series of processings ends.

In this way, in the present embodiment, by changing the sectional integration width in accordance with the vehicle speed and determining the impulse and discriminating the collided object, the collided object can be discriminated more reliably than the first embodiment and the second embodiment.

Figure 13A:
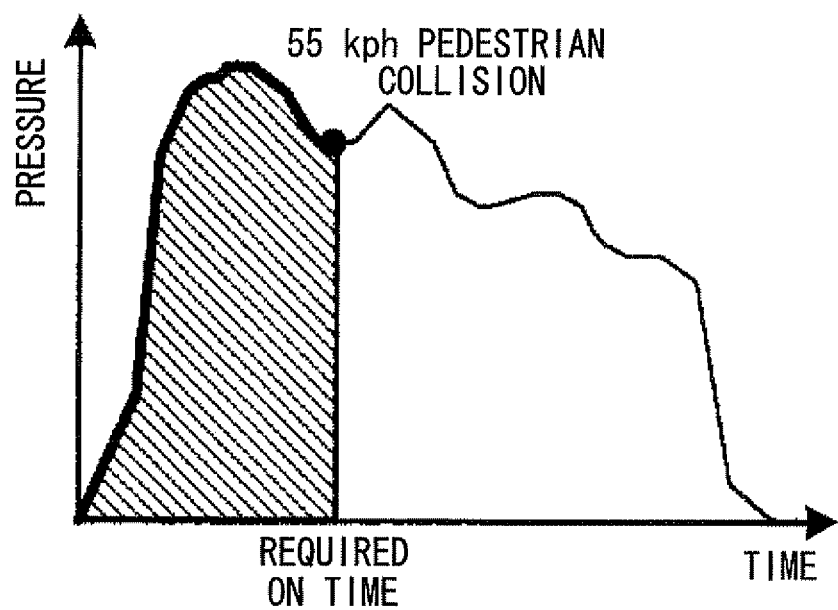
FIG. 13A is a drawing showing changes in pressure in a case of colliding with a pedestrian at 55 kph.
Figure 13B:
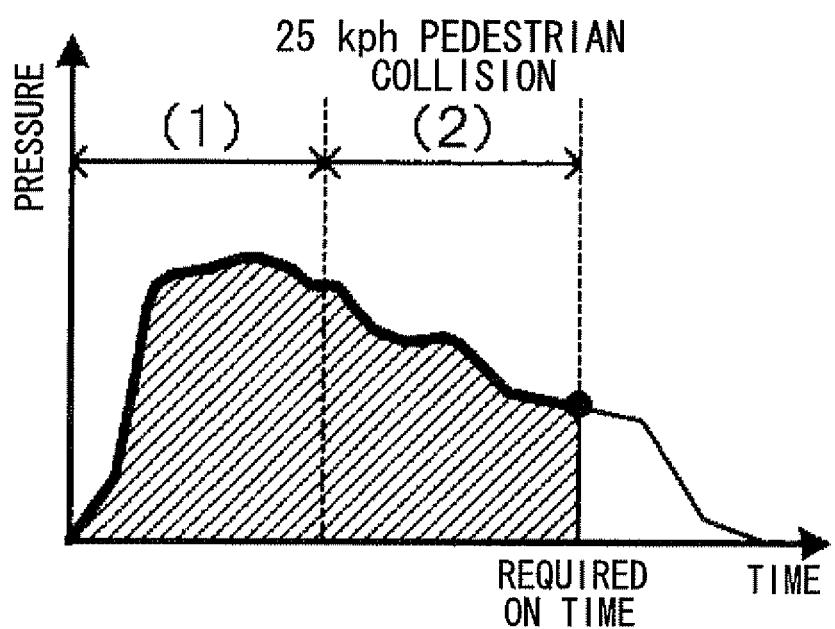
FIG. 13B is a drawing showing changes in pressure in a case of colliding with a pedestrian at 25 kph.
Figure 13C:
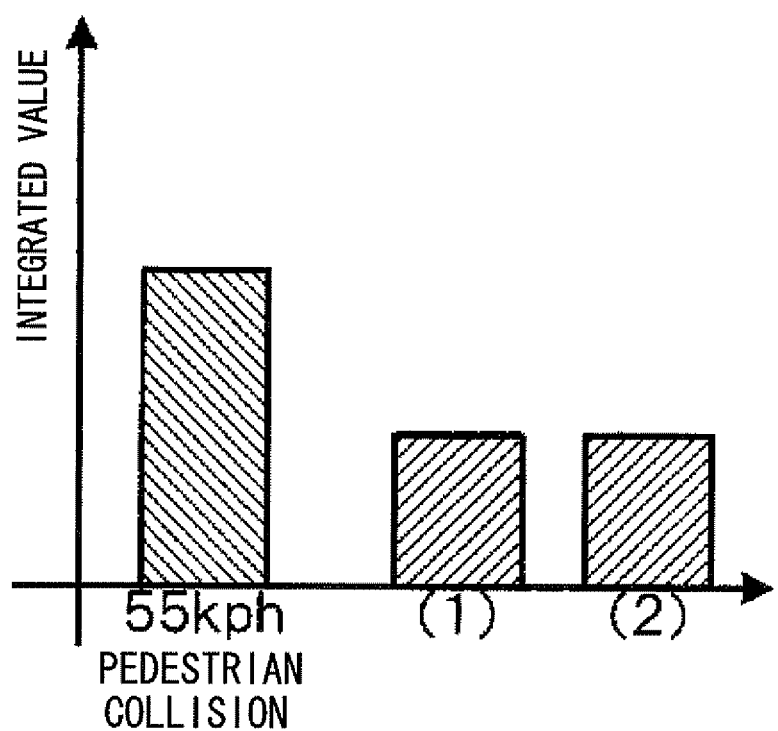
FIG. 13C is a drawing showing integrated values in a case of colliding with a pedestrian at 55 kph and in a case of colliding with a pedestrian at 25 kph.
Figure 13D:
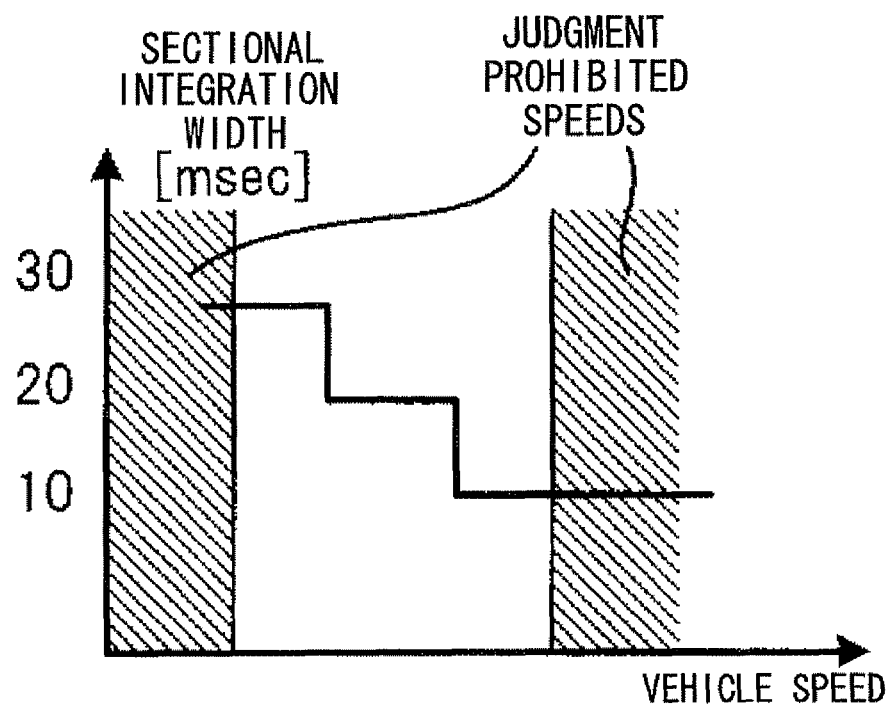
FIG. 13D is a drawing showing sectional integration widths corresponding to vehicle speeds.
Figure 13E:
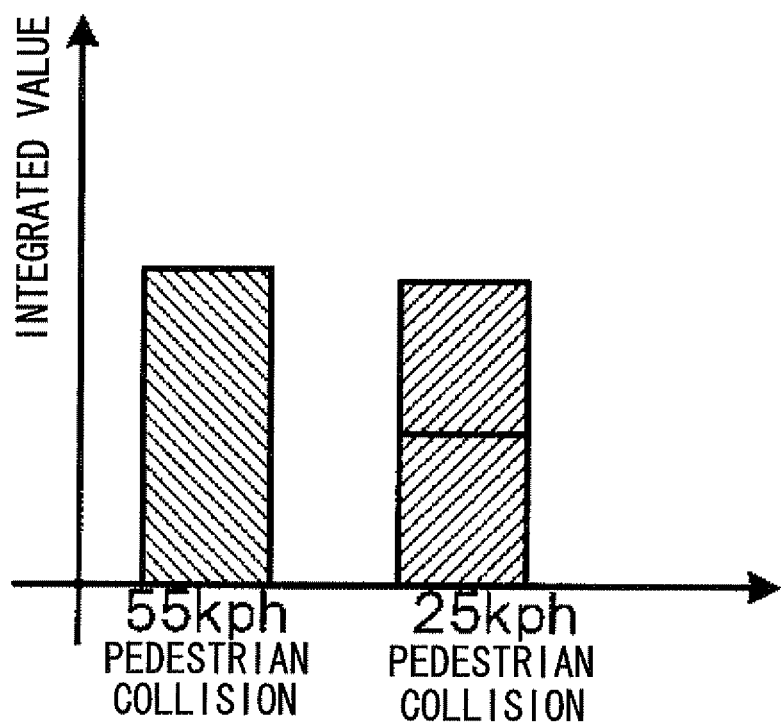
FIG. 13E is a drawing showing integrated values when changing the sectional integration width in accordance with vehicle speed.

For example, changes in pressure when colliding with a pedestrian at 55 kph are shown in FIG. 13A, and changes in pressure when colliding with a pedestrian at 25 kph are shown in FIG. 13B. The respective required on times (e.g., the times from colliding with the bumper until colliding with the hood, or the like) are respectively different. Here, if the sectional integration widths are made to be the same, as shown in FIG. 13C, the integrated value at the time of a 25 khp pedestrian collision is small as shown by (1) and (2) in FIG. 13C. However, in the present embodiment, as shown in FIG. 13D, the sectional integration width is changed in accordance with the vehicle speed within a predetermined range of vehicle speeds (judgment is prohibited outside of the predetermined range of the vehicle speeds). Therefore, as shown in FIG. 13E, the integrated value at the time of a 25 kph pedestrian collision increases, such as the sectional integration widths at the time of a 25 kph pedestrian collision (1)+(2), and becomes an integrated value of the same level as at the time of a 55 kph pedestrian collision, and a collided object can be accurately discriminated at low speed.

Note that the above embodiments are structured such that the bumper cover 16 deforms due to a collision, and the absorber 20 deforms before the pressure chamber 22 deforms. However, the structure of the front bumper 12 is not limited to this, and it suffices for a space and the absorber 20, or another member or the like, to be interposed between the bumper cover 16 and the chamber member 18. For example, the shape of the absorber 20 may be made to be L-shaped, and may be disposed between the bumper cover 16 and the bumper reinforcement 14, and between the bumper cover 16 and the chamber member 18, or the absorber 20 of another shape may be used.

Further, the above embodiments describe examples in which there is provided a structure that corrects the dead zone of the pressure sensor 24 from the bumper cover 16 deforming due to a collision until the pressure chamber 22 changes. However, in the case of a structure in which the dead zone of the pressure sensor 24 can be ignored, a structure for correcting the dead zone may be omitted.

Further, in the above embodiments, in a collision detecting device that detects a change in pressure of the pressure chamber 22 by the pressure sensor 24 and discriminates a collided object, an integrated value is calculated by making the sectional integration width of the pressure signal be a predetermined sectional integration width, or a sectional integration width that is determined in advance in accordance with the vehicle speed. However, the present invention is not limited to detecting a collision by the pressure sensor 24, and, for example, a structure in which an optical fiber is passed through a tube interior and is placed within the bumper and a collision is detected by using the distortion of the light as the load, or a structure that detects a collision by using an acceleration sensor, may be applied, and the sectional integration width of the detection results may be changed.

Further, the above embodiments describe, as examples, a case of calculating the effective mass as the discrimination value for discriminating the type of collided object, but the discrimination value is not limited to the effective mass. For example, the impulse generated by a collision may be determined as the discrimination value by time-integrating the detection results of the pressure sensor 24, and the type of the collided object may be discriminated by using the determined impulse as is, or the type of the collided object may be discriminated by using the impulse that is obtained by calculating the integrated value of a physical amount corresponding to the load generated by a collision, other than pressure.

The invention claimed is:

1. A collision detecting device comprising:
   pressure detecting means for detecting pressure of a pressure chamber that is disposed within a vehicle bumper;
   vehicle speed detecting means for detecting vehicle speed;
   discrimination value calculating means for, in accordance with a vehicle speed detected by the vehicle speed detecting means, deciding upon a sectional integration width at which detection results of the pressure detecting means are time-integrated, and calculating a discrimination value for discriminating a type of a collided object, on the basis of an integrated value obtained by time-integrating, at the sectional integration width that was decided upon, the physical amount detected by the detecting means, wherein the sectional integration width is variable; and
   discriminating means for discriminating the type of the collided object on the basis of the discrimination value.

2. The collision detecting device of claim 1, further comprising correcting means for correcting the discrimination value on the basis of energy needed from a vehicle bumper surface deforming due to a collision until the pressure chamber deforms,
   wherein the discriminating means discriminates the type of the collided object on the basis of a corrected value corrected by the correcting means.

3. The collision detecting device of claim 2, wherein the discrimination value calculating means calculates the discrimination value on the basis of the integrated value obtained by integrating at the sectional integration width, and detection results of the vehicle speed detecting means, and
   the correcting means corrects the discrimination value by correcting the detection results of the vehicle speed detecting means of a time of calculating the discrimination value, on the basis of energy needed from a vehicle bumper surface deforming until the pressure chamber deforms.

4. The collision detecting device of claim 2, wherein the correcting means corrects the discrimination value by correcting detection results of the pressure detecting means on the basis of energy needed from a vehicle bumper surface deforming until the pressure chamber deforms.

5. The collision detecting device of claim 1, wherein the discrimination value calculating means calculates an effective mass of the collided object as the discrimination value, on the basis of the integrated value and detection results of the vehicle speed detecting means.

6. The collision detecting device according to claim 1, wherein the sectional integration width is a time width that decreases as the vehicle speed increases.

7. A collision detecting device comprising:
- detecting means for detecting a physical amount corresponding to load generated by a collision;
- discrimination value calculating means for, in accordance with vehicle speed, deciding upon a sectional integration width at which detection results of the detecting means are time-integrated, and calculating a discrimination value for discriminating a type of a collided object, on the basis of an integrated value obtained by time-integrating, at the sectional integration width that was decided upon, the physical amount detected by the detecting means, wherein the sectional integration width is variable; and
- discriminating means for discriminating the type of the collided object on the basis of the discrimination value.

8. The collision detecting device according to claim 7, wherein the sectional integration width is a time width that decreases as the vehicle speed increases.

* * * * *